(12) United States Patent
Tumpold et al.

(10) Patent No.: US 11,549,917 B2
(45) Date of Patent: Jan. 10, 2023

(54) SYSTEM AND METHOD FOR A REFERENCE CHAMBER WITH A HOUSING AND A DEFLECTABLE STRUCTURE

(71) Applicant: Infineon Technologies AG, Neubiberg (DE)

(72) Inventors: David Tumpold, Kirchheim b Munich (DE); Alfons Dehe, Villingen-Schwenning (DE)

(73) Assignee: Infineon Technologies AG, Neubiberg (DE)

( * ) Notice: Subject to any disclaimer, the term of this patent is extended or adjusted under 35 U.S.C. 154(b) by 834 days.

(21) Appl. No.: 16/053,177

(22) Filed: Aug. 2, 2018

(65) Prior Publication Data

US 2019/0041363 A1 Feb. 7, 2019

(30) Foreign Application Priority Data

Aug. 3, 2017 (DE) .......................... 102017213520.4

(51) Int. Cl.
| | |
|---|---|
| *G01N 29/24* | (2006.01) |
| *G01N 29/30* | (2006.01) |
| *G01N 29/44* | (2006.01) |
| *G01N 29/036* | (2006.01) |

(52) U.S. Cl.
CPC ....... *G01N 29/2425* (2013.01); *G01N 29/036* (2013.01); *G01N 29/2418* (2013.01); *G01N 29/30* (2013.01); *G01N 29/4436* (2013.01); *G01N 2291/021* (2013.01); *G01N 2291/0256* (2013.01)

(58) Field of Classification Search
CPC .......... G01N 29/2425; G01N 29/4436; G01N 29/036; G01N 29/2418; G01N 29/30; G01N 2291/0256; G01N 2291/021
USPC ....................................................... 73/24.02
See application file for complete search history.

(56) References Cited

U.S. PATENT DOCUMENTS

| | | | | |
|---|---|---|---|---|
| 4,961,345 A | * | 10/1990 | Tsuruoka | ............. G01L 9/0016 73/32 A |
| 5,452,268 A | * | 9/1995 | Bernstein | ............. H04R 19/005 367/181 |
| 6,295,875 B1 | * | 10/2001 | Frick | ...................... G01L 9/125 73/718 |

(Continued)

FOREIGN PATENT DOCUMENTS

| | | | | |
|---|---|---|---|---|
| JP | 2008085507 A | * | 4/2008 | |
| WO | WO-2010043268 A1 | * | 4/2010 | ........... G01N 29/022 |

*Primary Examiner* — Marrit Eyassu
(74) *Attorney, Agent, or Firm* — Slater Matsil, LLP

(57) ABSTRACT

A reference chamber for a fluid sensor comprises a housing, a deflectable structure, which is arranged movably within the housing, a control device configured to drive the deflectable structure at a first point in time such that the deflectable structure assumes a defined position, and to drive the deflectable structure at a second point in time such that the deflectable structure moves out of the defined position and a movement of the deflectable structure in the housing is obtained. The reference chamber comprises an evaluation device configured to determine a movement characteristic of the movement of the deflectable structure on the basis of the moving into the defined position or on the basis of the moving out of the defined position and to determine an atmospheric property in the housing on the basis of the movement characteristic.

31 Claims, 11 Drawing Sheets

(56) References Cited

U.S. PATENT DOCUMENTS

| | | | |
|---|---|---|---|
| 10,488,288 B2* | 11/2019 | Sooriakumar | H05K 1/18 |
| 2002/0194897 A1 | 12/2002 | Arnott et al. | |
| 2010/0020326 A1* | 1/2010 | Van Kesteren | G01N 21/1702 |
| | | | 356/437 |
| 2011/0137580 A1* | 6/2011 | Bartels | G01F 3/20 |
| | | | 702/47 |
| 2012/0279279 A1 | 11/2012 | Rezachek et al. | |
| 2014/0298884 A1* | 10/2014 | Mindlin | G01L 27/00 |
| | | | 29/428 |
| 2015/0101395 A1* | 4/2015 | Dehe | G01N 29/2425 |
| | | | 73/24.02 |
| 2016/0091378 A1* | 3/2016 | Tsai | G01L 19/0092 |
| | | | 73/728 |
| 2017/0219450 A1* | 8/2017 | Swoboda | G01L 27/002 |

\* cited by examiner

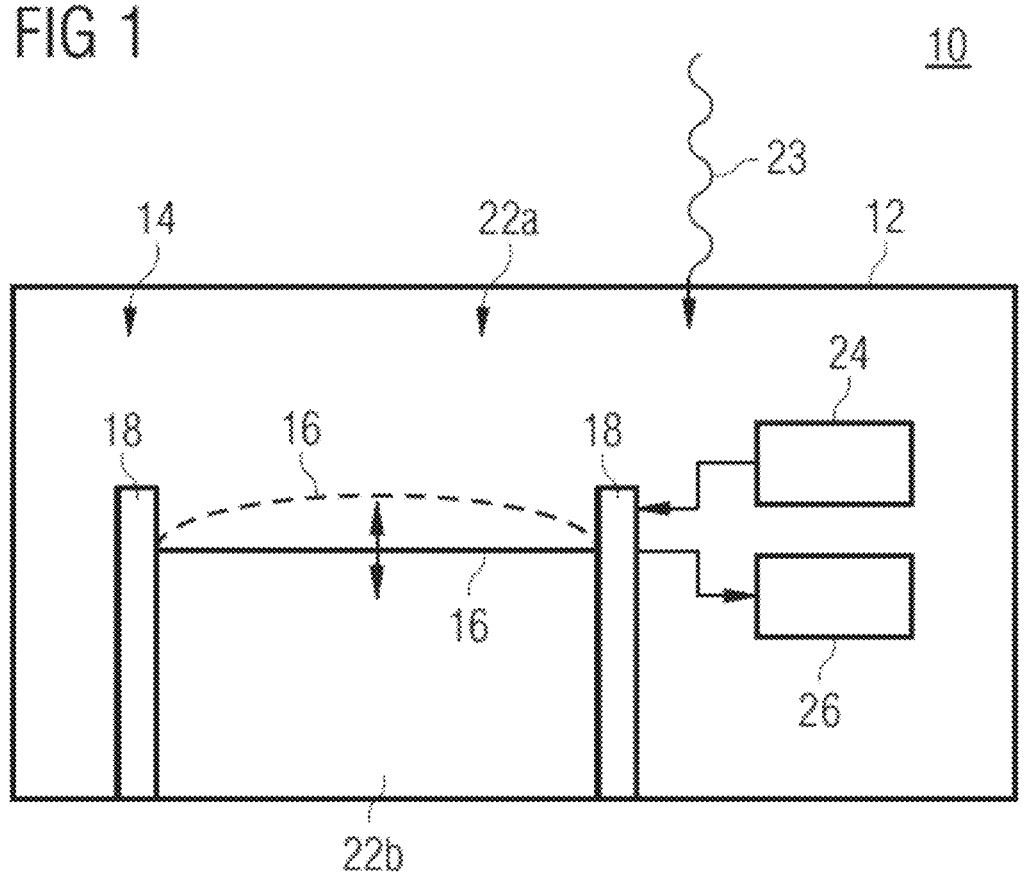

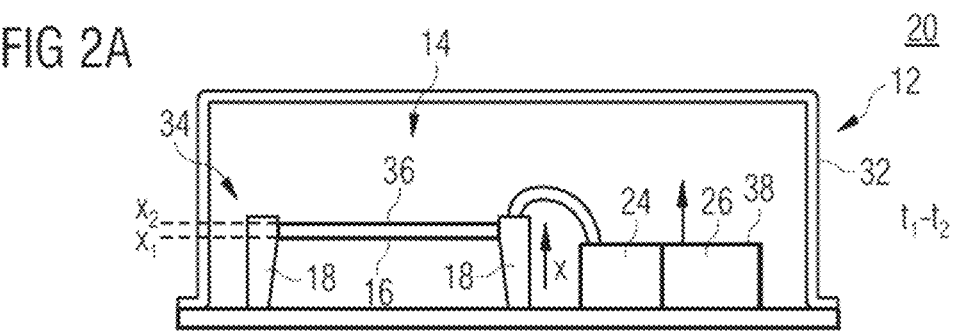
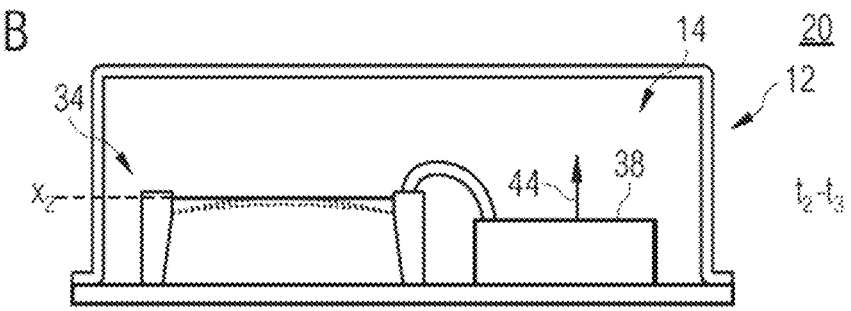
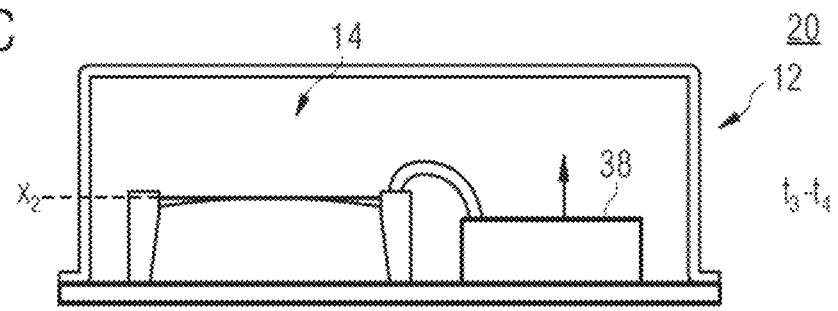
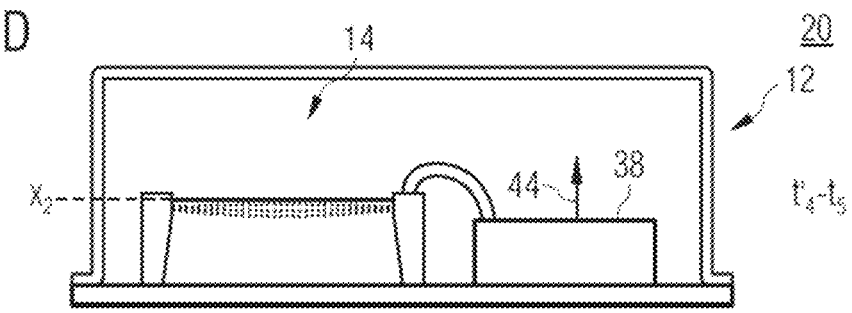
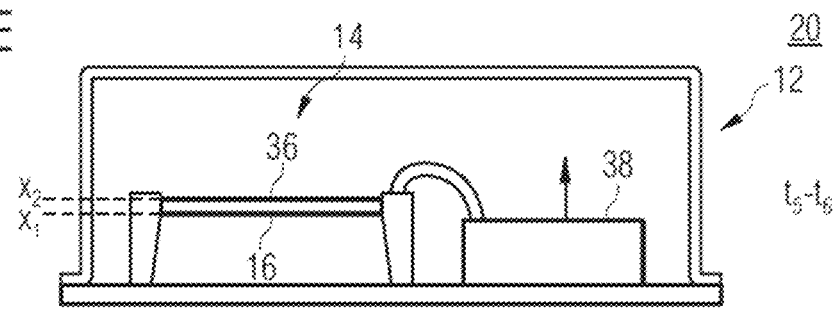

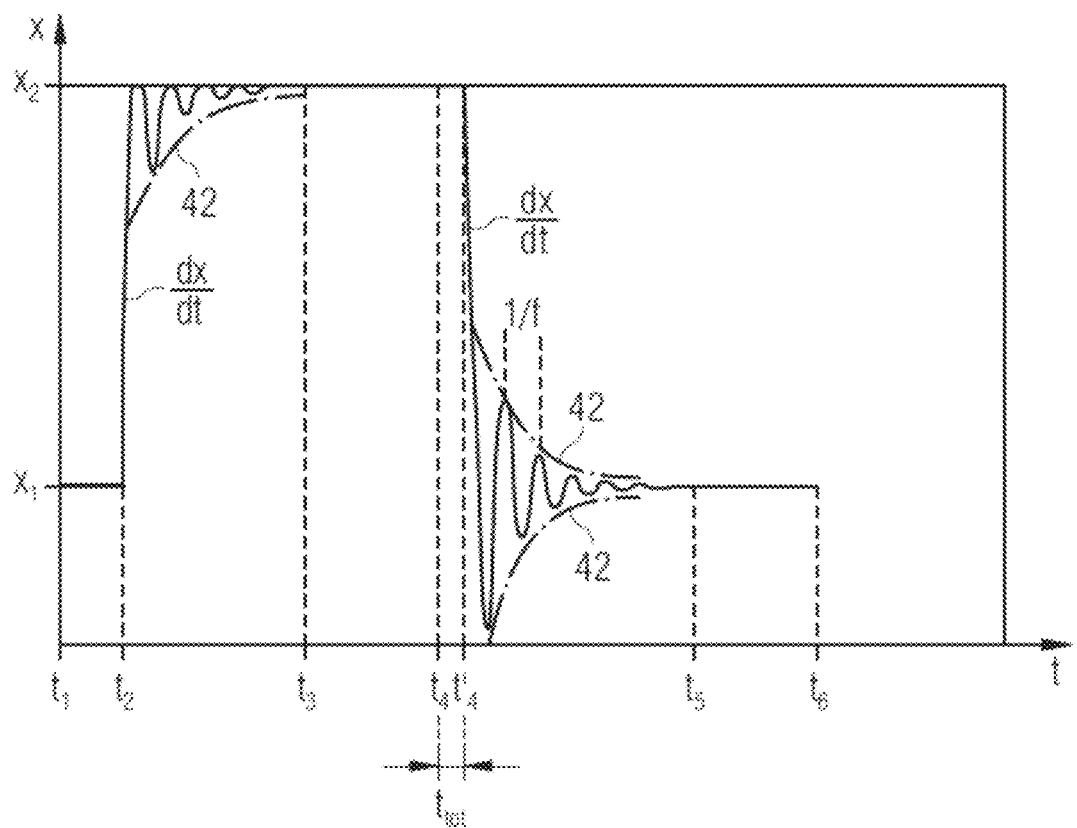

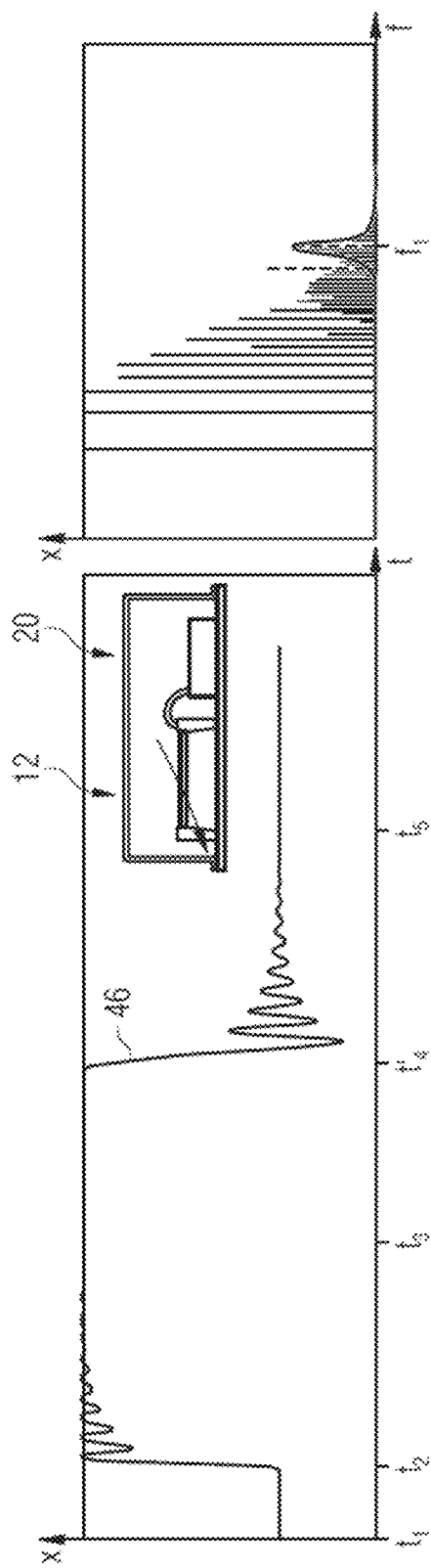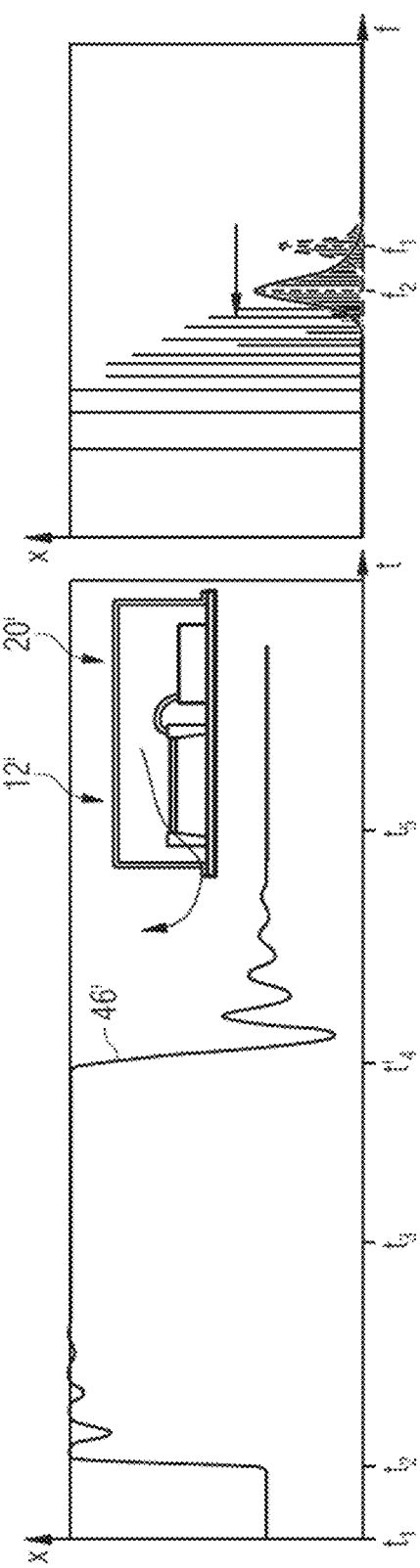

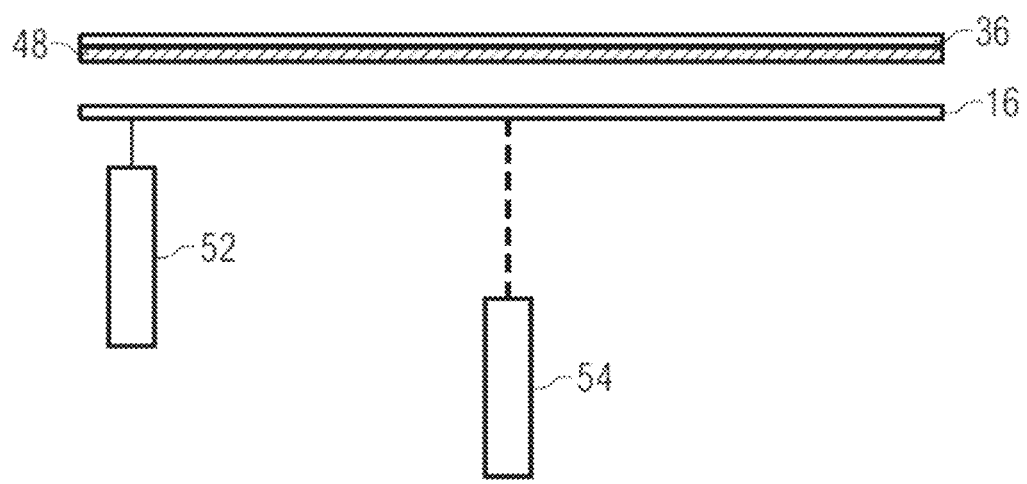
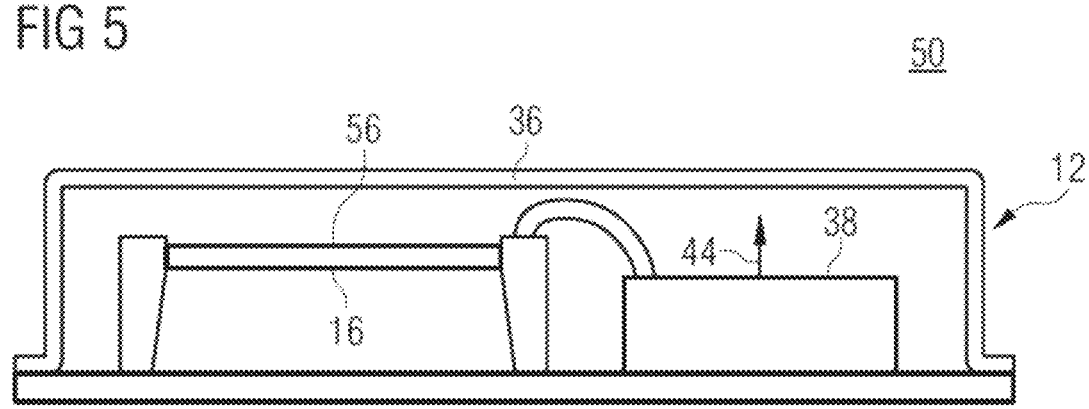

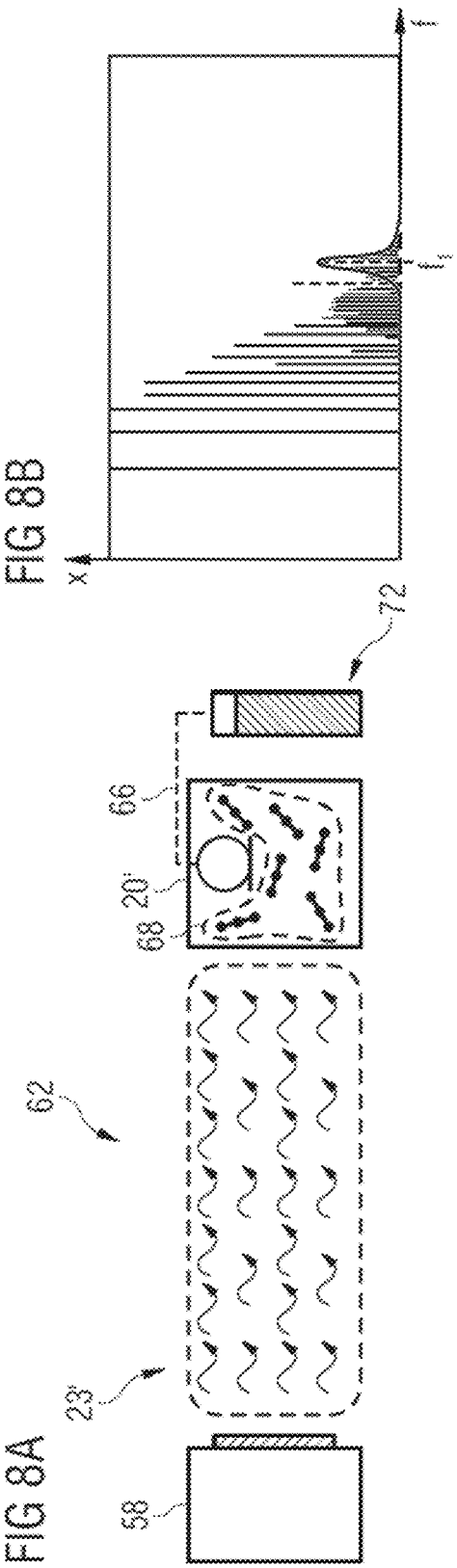
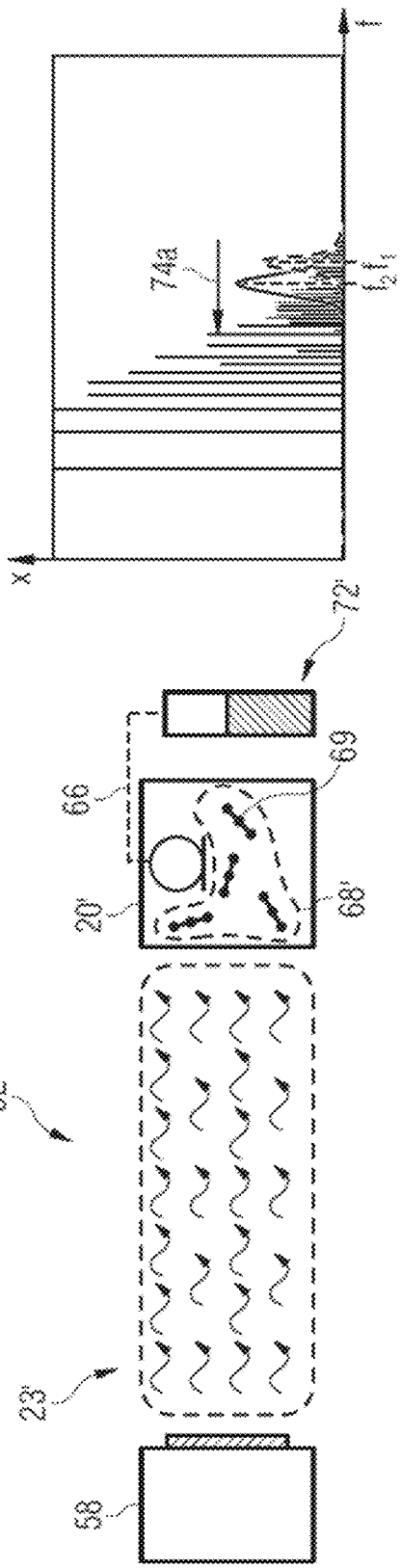

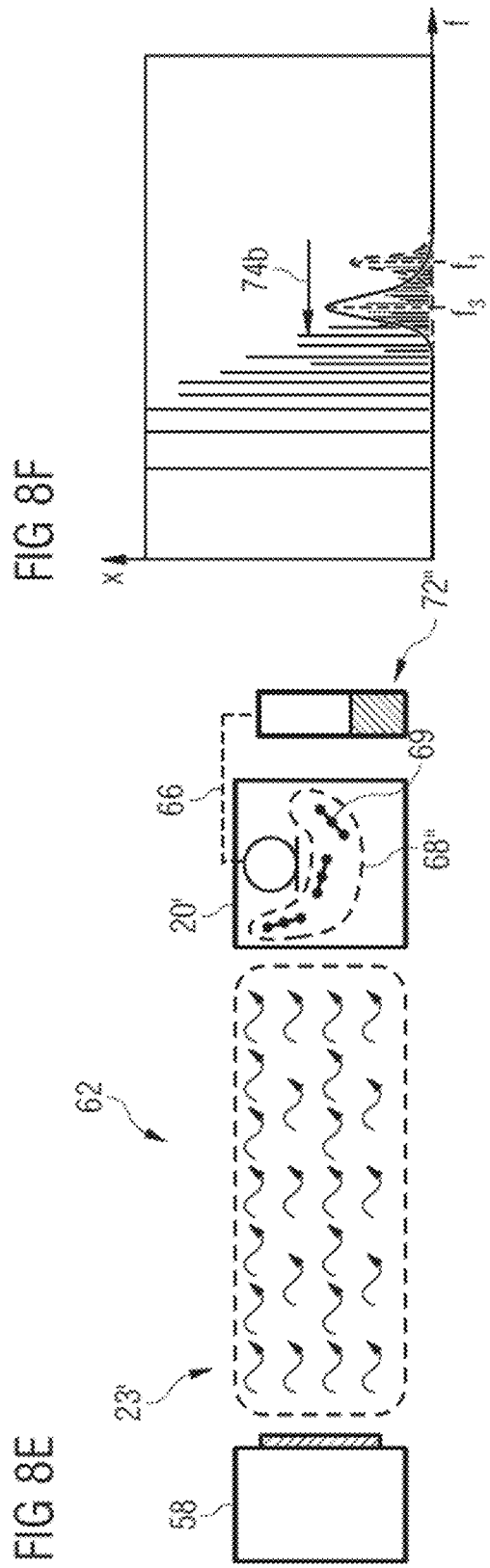

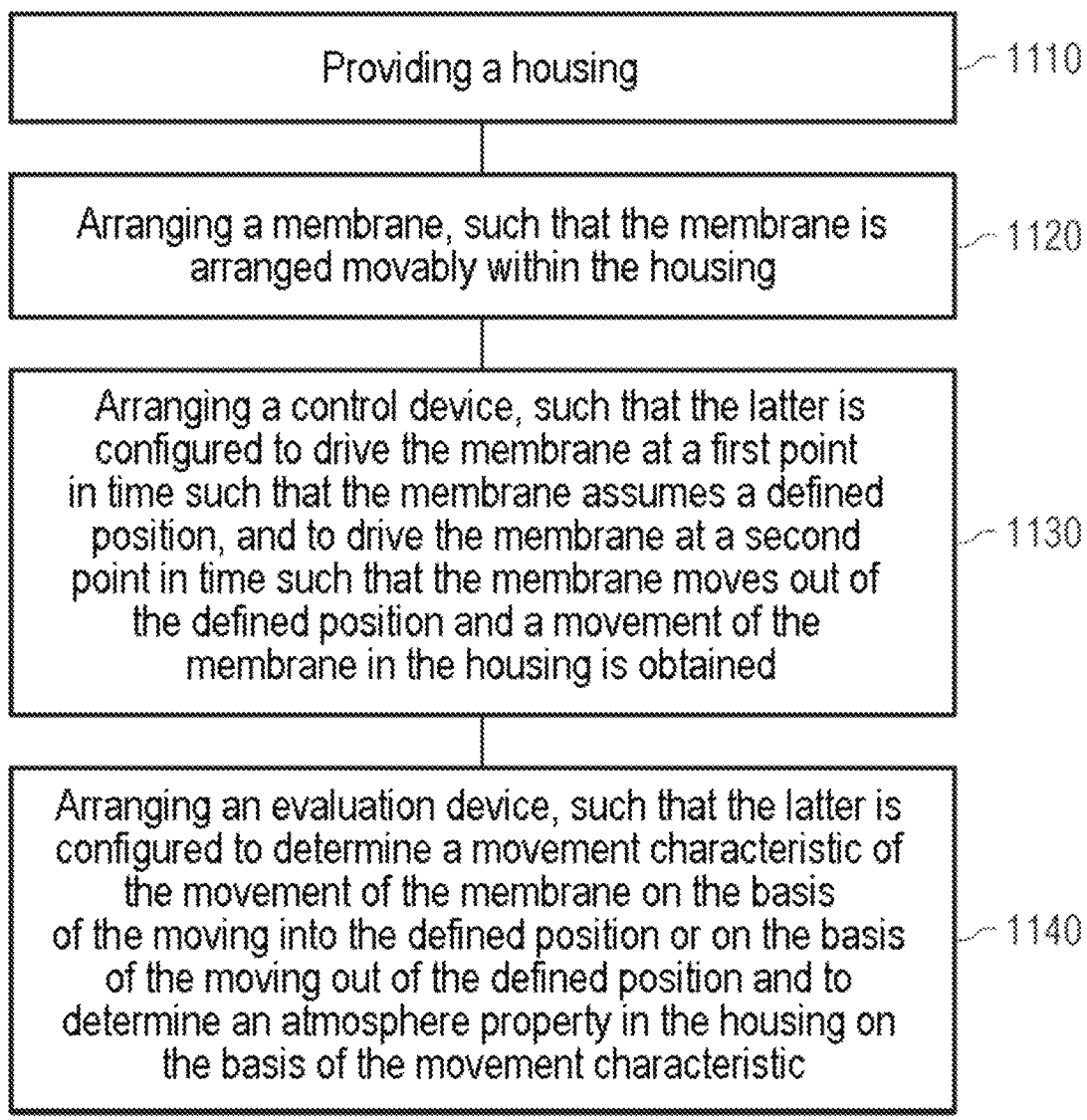

```
┌─────────────────────────────────────────────────┐
│ Deflecting the membrane at a first point in time, such │
│ that the membrane assumes a defined position and such │ — 1210
│ that the membrane at a second point in time moves out │
│ of the defined position and a movement of the membrane │
│             in the housing is obtained           │
└─────────────────────────────────────────────────┘
                         │
┌─────────────────────────────────────────────────┐
│ Determining a movement characteristic of the movement │
│   of the membrane on the basis of the moving into the │ — 1220
│   defined position or on the basis of the moving out of the │
│                  defined position                │
└─────────────────────────────────────────────────┘
                         │
┌─────────────────────────────────────────────────┐
│  Determining an atmosphere property in the housing │ — 1230
│       on the basis of the movement characteristic │
└─────────────────────────────────────────────────┘
```

SYSTEM AND METHOD FOR A REFERENCE CHAMBER WITH A HOUSING AND A DEFLECTABLE STRUCTURE

This application claims the benefit of German Application No. 102017213520.4, filed on Aug. 3, 2017, which application is hereby incorporated herein by reference in its entirety.

TECHNICAL FIELD

The present disclosure relates to system and method for a reference chamber with a housing and a deflectable structure.

BACKGROUND

Photoacoustic sensors (PAS) can have an infrared emitter (signal source) and a reference chamber (signal sink), between which an absorption path is arranged. Thermal radiation can be emitted from the emitter through the absorption path to the reference cell, wherein a portion of the thermal radiation is manipulated or absorbed in the absorption path by a gas situated there, that is to say that gas acts like a filter. The filtered radiation can be received in the reference chamber and be evaluated, thereby enabling a conclusion to be drawn about the gas situated in the absorption path.

Reference chambers for fluid sensors and fluid sensors and apparatuses comprising fluid sensors of this type which are reliable and/or enable a reliable evaluation of the gas in the absorption path would be desirable.

SUMMARY

Exemplary embodiments provide a reference chamber for a fluid sensor. The reference chamber comprises a housing and a deflectable structure, which is arranged movably within the housing. The reference chamber comprises a control device configured to drive the deflectable structure at a first point in time such that the deflectable structure assumes a defined position. The control device is furthermore configured to drive the deflectable structure at a second point in time such that the deflectable structure moves out of the defined position and a movement of the deflectable structure in the housing is obtained. The reference chamber comprises an evaluation device configured to determine a movement characteristic of the movement of the deflectable structure on the basis of the moving into the defined position and/or to determine an atmospheric property in the housing on the basis of the movement characteristic.

A further exemplary embodiment provides a fluid sensor comprising an emitter configured to emit a thermal radiation, and comprising a reference chamber in accordance with embodiments described herein. The fluid sensor comprises an absorption path arranged between the emitter and the reference chamber. The fluid sensor is configured to perform a photoacoustic evaluation of a fluid arranged in the absorption path on the basis of an evaluation of a movement of the deflectable structure that is generated by the thermal radiation.

A further exemplary embodiment provides a method for providing a reference chamber. The method comprises providing a housing and arranging a deflectable structure, such that the deflectable structure is arranged movably within the housing. The method comprises arranging a control device, such that the latter is configured to drive the deflectable structure at a first point in time such that the deflectable structure assumes a defined position, and to drive the deflectable structure at a second point in time such that the deflectable structure moves out of the defined position and a movement of the deflectable structure in the housing is obtained. The method comprises arranging an evaluation device, such that the latter is configured to determine a movement characteristic of the movement of the deflectable structure on the basis of the moving into the defined position and/or on the basis of the moving out of the defined position and to determine an atmospheric property in the housing on the basis of the movement characteristic.

A further exemplary embodiment provides a method for determining an atmospheric property in a reference chamber having a deflectable structure arranged movably within a housing of the reference chamber. The method comprises deflecting the deflectable structure at a first point in time, such that the deflectable structure assumes a defined position and such that the deflectable structure at a second point in time moves out of the defined position and a movement of the deflectable structure in the housing is obtained. The method comprises determining a movement characteristic of the movement of the deflectable structure on the basis of the moving into the defined position and/or on the basis of the moving out of the defined position. The method furthermore comprises determining an atmospheric property in the housing on the basis of the movement characteristic.

BRIEF DESCRIPTION OF THE DRAWINGS

Exemplary embodiments are explained below with reference to the accompanying drawings, in which:

FIG. 1 shows a schematic lateral sectional view of a reference chamber in accordance with one exemplary embodiment;

FIGS. 2a-2f show a reference chamber in accordance with a further exemplary embodiment, wherein a deflectable membrane is part of a microphone;

FIG. 3a schematically shows a movement profile of the membrane as described with reference to FIGS. 2a to 2f in accordance with one exemplary embodiment;

FIG. 3b shows a schematic graph of an evaluation of the movement profile from FIG. 3a in the frequency domain in accordance with one exemplary embodiment;

FIGS. 3c-d show a movement profile of the membrane and an associated schematic graph of an evaluation of the movement profile in accordance with FIGS. 3a-b, wherein the housing is untight in accordance with one exemplary embodiment;

FIG. 4 shows a schematic arrangement of the membrane opposite a stator electrode, wherein an insulation structure is arranged between the membrane and the stator electrode, in accordance with one exemplary embodiment;

FIG. 5 shows a schematic lateral sectional view of a reference chamber in accordance with one exemplary embodiment, wherein the stator electrode is integrated into the housing, for example;

FIGS. 8a-8f show a schematic illustration of an autocalibration of a fluid sensor in accordance with one exemplary embodiment;

FIG. 11 shows a schematic flow diagram of a method in accordance with one exemplary embodiment for providing a reference chamber; and FIG. 12 shows a schematic flow diagram of a method in accordance with one exemplary embodiment which can be applied in order to determine an atmospheric property in a reference chamber.

DETAILED DESCRIPTION OF ILLUSTRATIVE EMBODIMENTS

Figure 6:
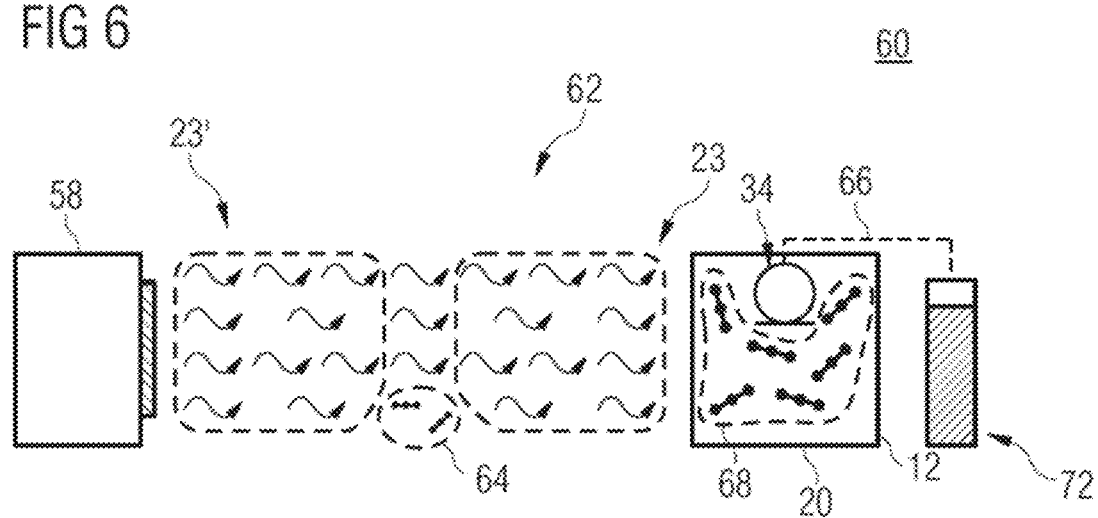
FIG. 6 shows a schematic block diagram of a fluid sensor in accordance with one exemplary embodiment.

Before exemplary embodiments are explained more specifically in detail below with reference to the drawings, it is pointed out that identical, functionally identical or identically acting elements, objects and/or structures in the various figures are provided with the same reference signs, such that the description of said elements as presented in the various exemplary embodiments is mutually interchangeable or can be applied to one another.

Some embodiments of the present disclosure relate to a reference chamber for a fluid sensor, for example a gas sensor, to a fluid sensor comprising a reference chamber of this type, to an apparatus comprising a fluid sensor, and to a method for providing a reference chamber, and a method for determining an atmospheric property in a reference chamber. Embodiment examples also include a resonance-based autocalibration for closed photo-acoustic sensors (PAS).

Exemplary embodiments below relate to a deflectable structure that can be suspended from a substrate. In this case, some of the embodiments below relate to a deflectable structure that is embodied as a membrane suspended from the substrate. The membrane can be a closed membrane having no or only slight openings. Alternatively, the deflectable structure can be an open membrane having openings, for instance residual release openings used during an undercut etching. The membrane can be suspended in a completely enclosed fashion or else be partly suspended. By way of example, the membrane can be embodied as partly slotted, such that the membrane is connected to the substrate incompletely, i.e. with less than 360°, at an outer circumference. In accordance with one embodiment, the membrane can be suspended over 360°, but have a cutout or a slot in first intervals of e.g. 10° and be connected to the substrate with alternate intervals of e.g. 10°. The slots can provide openings at which the membrane is then not suspended from the substrate. This can provide 18 subregions, for example, in which the membrane is connected to the substrate over respective angles of 10° and between which slots with an opening angle of 10° are respectively arranged, that is to say 18 securing intervals and 18 opening intervals. The number, arrangement and extent should be understood here to be merely by way of example and without a limiting effect.

The same can apply to beams or plate structures if they are suspended on at least one side or plates on 2 sides. That is to say that, alternatively or additionally, the deflectable structure can also be wholly or partly formed by or comprise a plate structure, beam structure and/or a pressure-dependent mechanical structure of arbitrary shape. A beam or plate structure can be arranged in a manner clamped in on one side, on two sides or on more sides at or in the substrate. The resonance can likewise be determined for structures of this type.

Exemplary embodiments below relate to reference chambers for a fluid sensor, to fluid sensors comprising a reference chamber of this type, to apparatuses comprising a fluid sensor of this type, and to methods for providing a reference chamber and for determining an atmospheric property in a reference chamber of this type. A membrane can be arranged in the reference chamber, said membrane being movable in order to be deflected on the basis of a received thermal radiation that interacts with a filling in the housing of the reference chamber or with the membrane itself. The membrane can be part of a micromechanical system (MMS) or of a microelectromechanical system (MEMS). Some of the exemplary embodiments below can be formed such that the reference chamber has a MEMS microphone, which in turn has a movable membrane used for the measurement purposes described herein. Alternatively, some other type of MMS or MEMS pressure transducer can be involved.

MMS/MEMS pressure transducers can be fabricated using semiconductor technology and/or comprise semiconductor materials. These include for example layers or wafers comprising a silicon material, a gallium arsenide material and/or some other semiconductor material. MMS/MEMS structures can have layer sequences comprising electrically conducting, electrically semiconducting and/or electrically poorly conducting or insulating layers in order to provide a corresponding MEMS functionality. In the exemplary embodiments described below, movable elements, for instance a membrane, can be suspended from a substrate. The substrate can be for example an amorphous, polycrystalline or crystalline semiconductor material, for instance silicon.

FIG. 1 shows a schematic lateral sectional view of a reference chamber 10, which can be used for a fluid sensor. The reference chamber 10 comprises a housing 12 enclosing a volume 14. The reference chamber 10 furthermore comprises a deflectable structure 16, which is arranged movably within the housing 12. The deflectable structure 16 is described below as a membrane, but can also be formed differently and/or comprise other structures, for instance a beam structure and/or a plate structure. Alternatively or additionally, the membrane can be partly or completely suspended. A movable arrangement here means that the membrane 16 is deflectable. That is to say that it can be held or clamped in by a substrate 18, for instance in an edge region of the membrane 16, and be deflectable in a central region, for instance if a thermal radiation 23 impinges on the volume 14. If a gas, for example, is arranged in the volume 14, then said gas can expand on the basis of the thermal radiation 23 and generate a pressure difference between partial cavities 22a and 22b in the volume 14, which can lead to a deflection of the membrane 16. Alternatively or additionally, the membrane 16 can also be suspended or clamped in at a different location. For inferring from the membrane behavior a fluid through which the thermal radiation 23 has passed, it is possible to use knowledge regarding a filling or an assumed atmospheric property of the volume 14. The atmospheric property can relate to a property of the filling, that is to say a presence or absence of a fluid in the housing 12, which can change as a result of an untightness of the housing 12. The atmospheric property can be at least one from a pressure within the housing 12, a composition of a fluid in the housing 12 and a number of fluid molecules in the housing 12. The atmospheric property and/or a change therein can be linked to a changed movement characteristic of the membrane 16, a dead time until the membrane 16 moves out of the defined position, an oscillation frequency of the membrane, an oscillation amplitude of the membrane, an oscillation damping of the oscillation of the membrane, a slope of the movement of the membrane, a limiting frequency of the membrane and a resonant frequency of the oscillation of the membrane.

That is to say that knowledge regarding the atmospheric property, for instance a pressure or vacuum, a composition and/or a number of molecules of a reference fluid or reference gas, can be used for a calibration of the sensor.

The reference chamber 10 comprises a control device 24 configured to drive the membrane 16 at a first point in time such that the membrane 16 assumes a defined position illustrated by dashed lines. The control device 24 is configured to drive the membrane 16 at a second point in time such that the membrane 16 moves out of the defined position, such that a movement of the membrane 16 in the housing 12 is obtained. In order to obtain the movement into the defined position and/or the movement out of the defined position, a force member or actuator can be arranged which deflects the membrane 16 on the basis of driving by the control device 24. By way of example, pneumatic, electrical, hydraulic and/or piezoelectric actuators can be provided for this purpose, which are in contact with the membrane 16 at least at times in order to transmit a force. Alternatively, the membrane 16 can also comprise a conductive layer, that is to say comprise an electrode and form an electrode pair on the basis with a further electrode. This is also described below such that the membrane 16 can be an electrode. The control device 24 can be configured to apply an electrical voltage or a potential difference to the electrode pair in order to bring about the movement of the membrane 16 into the defined position and/or the movement out of the defined position by utilizing electrostatic and/or electrodynamic forces.

The reference chamber 10 comprises an evaluation device 26 configured to determine a movement characteristic of the movement of the membrane 16 on the basis of the moving into the defined position and/or on the basis of the moving out of the defined position. The evaluation device 26 is furthermore configured to determine an atmospheric property in the housing 12 on the basis of the movement characteristic.

Although the control device 24 and the evaluation device 26 are illustrated as arranged within the housing 12, at least one of the two elements can be arranged outside the housing 12, for instance by a through contact being provided which enables driving or evaluation of the membrane 16 through the housing 12. That is to say that although the embodiments described herein are fashioned such that the reference chamber comprises the control device 24 and the evaluation device 26, this should not necessarily be understood to mean that the control device 24 and/or the evaluation device 26 are/is arranged mandatorily within the housing 12.

Fluid sensors can be formed such that an emission of a thermal radiation by an emitter is known, and also an effect of the thermal radiation in the volume 14 of the housing 12. For this purpose, the volume 14 can have a defined reference gas, a defined reference pressure (for instance at a reference temperature) and/or a low pressure. Low pressure is understood here to mean a technically implementable vacuum which may have residual molecules of a fluid or gas, but should substantially be considered to be a vacuum. To put it simply this means that instead of a reference gas it is also possible for no gas or fluid to be arranged in the volume 14. Independently of the actual filling or non-filling in the volume 14 there is high interest in the state within the volume 14 remaining unchanged at least under the reference conditions (temperature, pressure, etc.), that is to say that the housing 12 closes the volume 14 reliably and in an unchanged manner. In a desired state, i.e. in a functional operating state or a state in which the housing 12 is regarded as fault-free or at least ready for operation, the housing 12 can be formed in a hermetically sealed fashion.

This makes it possible that, with the emitted thermal radiation remaining constant, any difference in the excitation of the membrane 16 that is effected by the thermal radiation 23 can be attributed to differences in the fluid arranged in the absorption path, such that the evaluation carried out enables conclusions to be drawn about the fluid arranged in the absorption path.

An untightness or a leak in the housing 12 can lead to a change in the state in the reference chamber 10, such that a change or corruption of measurement results would be obtained owing to this. At the same time, however, the filling or non-filling of the volume 14 is directly coupled to the movement of the membrane 16. By way of example, if a pressure in the volume 14 changes, then a movement resistance acting on the membrane 16 changes since a change in a mechanical or fluidic movement resistance 16 acting on the membrane 16 is accompanied by a change in the pressure and/or a number of fluid molecules in the volume 14. This can also be understood to mean that an untightness in the housing 12 leads to a change in a composition of the fluid in the volume 14, to a variable pressure (rising or falling) or the like, which can also be understood as a variable viscosity or mass of a filling medium in the volume 14. Said variable viscosity or mass leads to a variable movement of the membrane 16 through the thermal radiation 23 and/or through the driving of the control device 24. That is to say that the atmospheric property can relate to one or more from a pressure of the fluid within the housing 12, a composition of the fluid in the housing 12 and/or a number of fluid molecules in the housing 12.

Exemplary embodiments make use of this effect by ascertaining a change during the movement of the membrane 16 into the defined position and/or out of the defined position. Since said movement is generated by the control device, it can be independent of thermal radiation or at least influenced little by thermal radiation, such that the presence or constitution of fluids in absorption paths can also have a minor significance. Rather, the movement that is brought about by the control device can be understood as intrinsic excitation that is evaluated by the evaluation device. A variable reaction of the membrane 16 to an excitation by the control device that has remained unchanged can be referred back to a change in the fluid in the volume 14 and hence to an untightness, which can be rectified by a recalibration or by an exchange of the reference chamber 10 in a fluid sensor.

A reference chamber 20 in accordance with one exemplary embodiment is described with reference to FIGS. 2*a* to 2*f*. FIG. 2*a* shows the reference chamber 20 in a state in which the membrane is in a rest state, for instance between two measurements. The housing 12 can be formed at least partly by a carrier substrate 28, for instance a circuit board or the like, and partly by a housing cover 32, for instance comprising a metal material, a semiconductor material and/or a plastic. Both the carrier substrate 28 and the housing cover 32 can each be formed in a hermetically sealed fashion per se and can likewise be connected to one another in a hermetically sealed fashion, for instance by the use of an adhesive or the like. The reference chamber 20 can comprise a MEMS microphone 34, which in turn comprises the membrane 16 as a movable electrode. Furthermore, the MEMS microphone 34 can comprise a stator electrode 36, which together with the membrane 16 forms an electrode pair, that is to say that the membrane 16 can comprise one electrode of an electrode pair. That is to say that the membrane 16 can be part of a microphone and/or of some other pressure transducer, for instance of a pressure sensor. The membrane 16 and the stator electrode 36 can be arranged adjacent to one another. Alternatively or additionally, by way of example, the electrodes 16 and 36 can be embodied in a closed fashion, i.e. likewise in a hermetically sealed fashion, such that between the two electrodes a volume is formed which can be closed with respect to the rest of the volume 14, that is to say is likewise hermetic. This makes it possible to maintain a high measurement accuracy since the fluidic coupling in this intermediate region can remain unchanged, even if the housing 12 has a leak.

The computing device 38 and/or the evaluation device 26 can be configured to output a signal 44 indicating a deviation of the atmospheric property from a reference or calibration state taking account of a tolerance range. The tolerance range can be for example ±100%, ±50% or ±20% of the respective atmospheric property. Alternatively or additionally, the signal 44 can have information specifying the movement carried out by the membrane 16.

The reference chamber 20 can comprise a computing device 38, which can provide the functionality of the control device 24 and the evaluation device 26 individually or in combination. The computing device 38, just like the control device 24 and/or the evaluation device 26, can be a processor, a microcontroller, a field programmable gate array and/or an application specific integrated circuit (ASIC). Alternatively, the control device 24 and the evaluation device 26 can also be arranged in the reference chamber 20. The computing device 38 can be electrically connected to the MEMS microphone 34. The computing device 38 can be configured to apply a voltage difference to the electrode pair 16 and 36. A deflection of the membrane 16 relative to the stator electrode 36 can be obtained as a result.

FIG. 2f shows a combinational profile of a deflection of the membrane 16 against a time axis taken as a basis jointly for FIGS. 2a to 2e, wherein the deflection of the membrane 16 is illustrated along an x-direction.

In the rest state illustrated in FIG. 2a, the membrane 16 of the MEMS microphone 34 can be in a rest position. For this purpose, the computing device 38 can apply to the electrode pair for example a voltage difference that is less than a snap-in voltage or a pull-in voltage of the MEMS microphone 34, at which a mechanical contact between the electrodes 16 and 36 is obtained. By way of example, a voltage of 0 V can be applied.

At a point in time $t_2$, the computing device 38 or the control device can be configured to apply to the electrodes of the electrode pair a voltage that is greater than the pull-in voltage. This is illustrated in FIG. 2b. By virtue of the electrical voltage that is greater than the pull-in voltage, the membrane 16 can carry out a mechanical contact with the stator electrode 36. This is illustrated by the position $x_2$ in FIG. 2f. Depending on a speed at which the membrane 16 approaches the stator electrode 36, bounce effects can occur, that is to say that the membrane 16 intermittently in an oscillatory movement can move away again from the stator electrode 36 or the position $x_2$ and can be pulled in again and be moved in the direction of the stator electrode 36. Such an oscillatory movement of the membrane 16 is illustrated by the dashed lines.

A checking measurement described can be carried out at an arbitrary point in time, for instance in the context of a quality check before delivery. Alternatively or additionally, at least during a calibration interval such a routine can be carried out as calibration interval, for example between two regular measurements, that is to say during regular operation of the sensor for setting and/or checking whether the measurement carried out previously or subsequently yields a correct result.

In other words, the microphone membrane is led to the backplate electrode, the stator electrode 36. The ASIC 38 provides a voltage that is greater than the pull-in voltage, that is to say $V_{bias} > V_{pull-in}$. The membrane can oscillate or vibrate with its mechanical properties upon striking the stator electrode. The mechanical properties can for example comprise the natural frequency and/or be influenced by the interaction of the membrane 16 with the fluid or vacuum in the cavity 14.

As is illustrated in FIG. 2c, the oscillation obtained can decay, such that a static rest state is obtained at the position $x_2$ after a point in time $t_3$. The position $x_2$ can be referred to as a defined position since, independently of the level of the voltage applied to the electrode pair, the same position is always assumed as long as the voltage is greater than the pull in voltage. A defined position of this type could also be obtained if a supporting structure is arranged between the stator electrode 36 and the membrane 16, said supporting structure being substantially immobile relative to the substrate, such that the mechanical contact is obtained for example at the supporting structure.

Between a point in time $t_3$ and a point in time $t_4$, the membrane 16 can have a rest state, that is to say remain substantially immobile. For this purpose, the computing device 38 can furthermore apply a voltage that is greater than the pull-in voltage. This is illustrated in FIG. 2c. At the point in time $t_4$, the control device can be configured to drive the membrane 16 such that the membrane 16 moves out of the defined position $x_2$. The point in time $t_4$ can be arranged temporally such that after the preceding oscillation excitation the membrane has returned again to a rest state or at least an approximate rest state, that is to say still has a maximum of 20%, a maximum of 10% or a maximum of 5% of a maximum oscillation amplitude or no longer has an oscillation. That is to say that the control device can be configured to wait between the first point in time and the second point in time, i.e. the establishment and the release of the mechanical contact, until a time interval $t_3$ to $t_4$ or $t_5$ to $t_6$ elapses which enables a rest state of the membrane 16 to be obtained.

For releasing the membrane 16, the computing device 38 can be configured to reduce the voltage applied to the electrode pair, such that it is below a holding voltage, wherein the holding voltage can be lower than the pull-in voltage. After the voltage has been reduced at the point in time $t_4$, the membrane 16 can still remain in the defined position until it is released from the electrode 36 or moves out of the position $x_2$ at a point in time $t'_4$. A time difference between the points in time $t'_4$ and $t_4$ can be referred to as a dead time $t_{dead}$ and likewise be influenced by the atmospheric property, inter alia. That is to say that the control device can be configured to wait between the first point in time and the second point in time, i.e. the establishment and the release of the mechanical contact, until a time interval $t_3$ to $t_4$ or $t_5$ to $t_6$ elapses which enables a rest state of the membrane 16 to be obtained.

After the point in time $t'_4$, the membrane 16 can oscillate in a manner influenced by its own mechanical properties, for instance a material stiffness, and in a manner influenced by the filling or non-filling in the volume 14, as is illustrated by the dashed lines in FIG. 2d. This is illustrated by the oscillations between the points in time $t'_4$ and $t_5$ in FIG. 2f. In other words, the microphone membrane is released from the backplate electrode 36. The voltage of the ASIC falls below a release voltage $V_{release}$ and oscillates at a resonant frequency in accordance with the fluidic-mechanical coupling between the membrane 16 and the vacuum or fluid in the volume 14.

As is illustrated in FIG. 2e, after the point in time $t_5$ the membrane 16 can again have a rest mode, in which the computing device 38 can apply to the electrode pair a voltage that is lower than the pull-in voltage.

As is illustrated in detail in FIG. 2f, an oscillation can be obtained on the basis of the mechanical contact between the membrane 16 and the backplate electrode 36 between the points in time $t_2$ and $t_3$. A change in the position of the membrane 16 can also be referred to as dx/dt or a slope of the movement of the membrane 16. As is illustrated in the time interval between the points in time $t'_4$ and $t_5$, the oscillation of the membrane 16 can decay with time t, wherein this is representable by an envelope 42 that describes an oscillation damping of the oscillation of the membrane 16.

The evaluation device can be configured to detect the movement and/or oscillation of the membrane 16 and to determine at least one from the slope dx/dt, the dead time $t_{dead}$, an oscillation frequency f of the membrane 16, an oscillation amplitude of the membrane 16, an oscillation damping of the oscillation of the membrane 16, a slope of the movement of the membrane 16, a limiting frequency of the membrane 16 and a resonant frequency of the oscillation of the membrane 16, in order to determine the atmospheric property in the housing 12 on the basis of this parameter determined. Each of these parameters and a combination thereof can be understood as a movement characteristic that provides information regarding a change in a movement resistance of a filling medium or of no filling medium in the housing 12, said movement resistance acting on the membrane 16. This can involve the mechanical or fluidic movement resistance that is influenced by a viscosity of the filling medium.

The evaluation device or the computing device can be configured to evaluate both the oscillation of the membrane 16 into the defined position $x_2$ and/or an oscillation of the membrane out of the defined position $x_1$, i.e. after the point in time $t_4$¬.

Although FIGS. 2a to 2f have been described such that the defined position is the location of the mechanical contact of the electrodes, with a release of the mechanical contact and/or an establishment of the mechanical contact, for instance as a result of bounce, enabling evaluatable oscillations, alternatively some other procedure can also be implemented. In this regard, by way of example, the driving by the computing device 38 or the control device 24 can be obtained in which a voltage that is less than the pull-in voltage is used to move the membrane 16 in the direction of the stator electrode 36 and away therefrom. A rectangular signal, for example, can be used for this purpose. The drive signal can have a frequency that corresponds substantially, i.e. within a tolerance range of ±10%, ±5% or ±2%, to the expected resonant frequency. By way of example, if the amplitude of the oscillation thus obtained is evaluated, then the evaluation device 26 can ascertain from a deviation in the actually measured amplitude that a resonance shift has taken place, which leads to a reduced or increased amplitude. Said resonance shift can likewise indicate a change in the fluid in the housing 12 and indicate an untightness of the housing 12. That is to say that the defined position can be determined by a mechanical stop and/or mechanical contact, but alternatively can also be a position of the membrane 16 that is reached without a mechanical limitation, e.g. with a voltage below the pull-in voltage. This can involve a freely settable position. In other words, the system can also be operated taking account of electrical voltages lower than the pull-in voltage. The membrane can merely just experience a travel in order to be charged with a different potential energy compared with a central position. An exchange of the potential energy in the pulled-in state, i.e. the defined position, to the rest state can then correspond to the kinetic energy and can be described by way of the complete coupled chain of movement between mechanics and fluidics interaction. It is thus possible both to attain the pull-in voltage and to attain the maximum membrane amplitude or to remain below the latter and the membrane can be only slightly, i.e. partly, pulled upward and then "freed" again in order to flip downward. In both cases, the system dynamic characteristic results in the desired behavior, which can then be read out via e.g. the resonant frequency. By way of example, a number of zero crossings of the resonance signal obtained can be measured and/or counted. These correlate with the damping coefficient k and thus with the mechanical/fluidic coupling between the membrane 16 and the fluid in the housing.

With reference to FIGS. 3a to 3d a description is given of an exemplary comparison of the form in which an untightness of the housing 12 of the reference chamber 20 can be ascertained by the evaluation device or the computing device 38.

FIG. 3a schematically shows a movement profile 46 of the membrane 16 as described with reference to FIGS. 2a to 2f.

FIG. 3b shows a schematic graph of an evaluation of the movement profile 46 in the frequency domain, for instance by carrying out a fast Fourier transformation (FFT) of the oscillations in the time interval $t_2$-$t_3$ and/or $t'_4$-$t_5$. The frequency evaluation can yield a resonant frequency $f_1$, for example.

While FIGS. 3a and 3b have been described by way of example for an undamaged and tight housing 12, FIGS. 3c and 3d describe by way of example a scenario for a housing 12', having a leak, of a damaged or defective reference chamber 20', which otherwise corresponds to the reference chamber 20. The changed atmospheric property in the housing 12' can lead to a changed movement profile 46', the frequency evaluation of which as illustrated in FIG. 3d can lead to a shift in the resonant frequency from the frequency $f_1$ toward the frequency $f_2$. The frequency $f_2$ can be greater or less than the frequency $f_1$.

Alternatively or additionally, it is possible to evaluate still other parameters of the movement characteristic such as were described in association with FIGS. 2a to 2f.

In other words, FIGS. 3a and 3b show a signal for the case where the reference chamber is filled with a pure reference gas and is sealed and tight. FIGS. 3c and 3d show a comparable signal for the case where the reference chamber is untight and is thus filled at least partly with air. The shift in the resonant frequency can correspond to the gas mixture in the reference chamber or the volume 14 and relate to the original gas composition if the volume 14 has been newly filled and sealed. In an extreme case, the frequency $f_2$ can be obtained if normal ambient air is arranged in the volume 14, that is to say that the housing 12 is completely untight. The resonance shift can thus be used as calibration information. If $CO_2$, for example, is considered as original fluid in the volume 14, which was replaced by ambient air as a result of an untightness, then the resonance shift results from parameters associated with the fluids. In this regard, $CO_2$ can have for example an isentropic exponent κ of 1.29 and a density ρ of 1.98 kg/m³, while air can have an isentropic exponent κ of 1.4 and a density κ of 1.29 kg/m³. This leads to a variable mechanical and/or fluidic coupling between the fluid and the membrane 16 and thus to a changed movement profile 46 or 46'.

The evaluation device or the computing device can be configured to detect the movement characteristic during a calibration interval, and to store information based on the movement characteristic in a memory as reference value. By way of example, the information based on the movement characteristic can be a resonant frequency or a movement amplitude. Alternatively or additionally, the information based on the movement characteristic can be the movement characteristic itself. During a checking interval, the movement characteristic can once again be detected by the evaluation device or the computing device. The evaluation device can be configured to compare the movement characteristic that has been detected once again with the stored information in order to obtain a comparison result, and to determine an atmospheric property on the basis of the comparison result. In this regard, by way of example, a deviation that goes beyond a tolerance range, which is for example ±100%, ±50% or ±20%, can be identified as defective. Alternatively or additionally, the result can also be interpreted such that for example small deviations allow an incipient untightness of the reference chamber to be inferred. The evaluation device and/or the computing device can be configured to output a signal indicating an imminent failure of the reference chamber and/or of the sensor in which the reference chamber is installed. Alternatively or additionally, the measurement cycle carried out last or the movement characteristic can be used as a new calibration interval, that is to say that the information based on the movement characteristic of the interval carried out last can be stored as a new reference value in a memory of the reference chamber and/or of the fluid sensor. This makes it possible firstly to maintain and/or reestablish a measurement accuracy and can alternatively or additionally also be used for monitoring or surveillance of the state of the reference chamber, for instance if a temporal profile of the change in the movement characteristic is detected. A renewed calibration, that is to say a second calibration interval, can be carried out after a predefined time interval and/or in the case of a deviation between measurement results that exceeds a tolerance range.

The signal 44 can for example also relate to or indicate a deviation of the atmospheric property from a reference state, for instance a delivery state of the reference chamber, taking account of a tolerance range. Alternatively or additionally, the evaluation device can be configured to indicate a leak in the housing and/or an imminent failure of the reference chamber on the basis of the atmospheric property.

FIG. 4 shows a schematic arrangement of the membrane 16 opposite the stator electrode 36, wherein an insulation structure 48 is arranged between the membrane 16 and the stator electrode 36, for instance adjacent to the stator electrode 36 and/or secured thereto, said insulation structure being configured to prevent an electrical short circuit between the electrodes 16 and 36 during the mechanical contact between the electrodes. The insulation structure 48 can comprise for example an insulation material, for instance silicon oxide or silicon nitride.

Furthermore, the membrane 16 is connected at least at times to an actuator 52 configured to move the membrane 16 into the defined position and/or to move said membrane out of said position. That is to say that, as an alternative or in addition to the use of electrostatic forces, it is also possible to use other actuator principles, for instance pneumatic, hydraulic, electrodynamic and/or piezoelectric actuators. By way of example, a piezoelectric layer can be arranged at the membrane 16 and can implement the actuator 52. This can be implemented as an alternative or in addition to the insulation structure 48.

As an alternative or in addition to the actuator 52 and/or the insulation structure 48, a detecting device 54 can be arranged which is configured to detect the movement profile and/or the movement characteristic of the membrane 16. By way of example, the detecting device 54 can be configured to carry out a non-contact detection of the movement of the membrane 16, for instance by means of optical measurement principles. That is to say that as an alternative or in addition to an electrical, for instance capacitive, detection in a MEMS microphone, some other, for instance optical, detection of the movement of the membrane 16 is also possible.

FIG. 5 shows a schematic lateral sectional view of a reference chamber 50 in accordance with one exemplary embodiment, wherein the stator electrode 36 is integrated into the housing 12, for example, and a supporting structure 56 is arranged between the stator electrode 36 and the membrane 16, said supporting structure being slightly movable or even immobile relative to the housing 12. An electric field between the electrodes 16 and 36 can then provide or enable a mechanical contact between the membrane 16 and the supporting structure 56, which enables the measurement principles explained above without restrictions. That is to say that, instead of a mechanical contact between two electrodes, it is also possible to provide a mechanical contact between the membrane 16 and the supporting structure 56.

FIG. 6 shows a schematic block diagram of a fluid sensor 60 in accordance with one exemplary embodiment. The fluid sensor 60 comprises an emitter 58 configured to emit a thermal radiation 23'. The emitter can be an arbitrary source of thermal radiation, for instance a heating element, an ohmic resistance element or an apparatus having electrical power loss that is configured to emit the thermal radiation 23'. The emitter can be a source of infrared radiation, that is to say that the thermal radiation 23' can be infrared radiation.

The fluid sensor 60 can furthermore comprise a reference chamber in accordance with one exemplary embodiment. The reference chamber can be for example the reference chamber 20. Alternatively or additionally, the reference chamber 10 and/or 50 can also be arranged. The reference chamber 20 can be arranged and configured to receive at least the thermal radiation 23. An absorption path 62 can be arranged between the emitter 58 and the reference chamber 20. The absorption path 62 can be a section, a path or a route or a channel traversed by the thermal radiation 23'. A fluid 64 that interacts with the thermal radiation 23' or is excited by the latter can be arranged in the absorption path 62. That can have the effect that part of the thermal energy of the thermal radiation 23' is changed, modified or absorbed in order to obtain the portion 23 of the thermal radiation 23' which can impinge on the reference chamber 20. The fluid 64 can be a liquid or a gas. The fluid sensor 60 can be configured to measure or to detect a gaseous fluid 64. In this case, the fluid sensor 60 can be a gas sensor.

The reference chamber 20 can thus be usable as a detector for the thermal radiation 23. The reference chamber 20 can be configured to provide a signal 66 by means of the evaluation device and/or the computing device, said signal being based on an excitation of the membrane 16 or of the microphone 34 by the thermal radiation 23. This is at least partly influenced by the fluid (filling) 68 arranged in the housing 12. As already mentioned, the filling 68 can also be an at least approximate vacuum. A specific level of the thermal radiation 23 leads to a specific signal level 72 of the signal 66 in the case of a specific atmospheric state of the filling 68.

In other words, the fluid sensor 60 can comprise an infrared emitter, for example having the radiation characteristic of a black body radiator. One possible driving of the emitter 58 is for example driving with a periodic signal. In the absorption path 62, part of the thermal energy can be absorbed by all the gases arranged there. The absorption chamber, that is to say the reference chamber, can be filled with a gas or a gas mixture and the membrane or a microphone, wherein a reference gas can be arranged here, i.e. for example between the microphone electrodes. A fluid (gas) arranged in the absorption path can function as a filter, such that an inverse measurement is carried out. A high signal level can indicate low fluid concentrations and a low signal level can indicate high fluid concentrations owing to high absorptions. On the basis of the fluid in the reference chamber, it is possible to determine or calculate the fluid concentration in the absorption path 62. This can have the effect that a sensor drift or an inaccuracy or deviation of the signal level 72 occurs if the housing or the reference chamber 20 has an untightness. Exemplary embodiments are reference chambers, fluid sensors, apparatuses and methods which make it possible to check the tightness of the housing during the operation of the fluid sensor. This can be referred to as a closed system since the reference chamber preferably remains closed, i.e. tight. The detection of environmental parameters such as noise, sounds, temperatures and/or gases is becoming increasingly important with regard to mobile apparatuses, building automation, industrial applications and in the automotive sector. Harmful fluid concentrations and gas concentrations can be brought about by contamination and/or malfunctions of specific devices. A gas measurement of this type by means of expedient sensors that are always available and connected to one another is an increasingly important topic, including in the future.

That is to say that the evaluation device can be configured to carry out, for a photoacoustic evaluation during a measurement interval, the evaluation of the movement of the membrane 16 that is generated by the thermal radiation 23 or 23' in the reference chamber 20, and to determine a fluid property of the fluid 64 arranged in the absorption path 62 on the basis of the evaluation.

Figure 7:
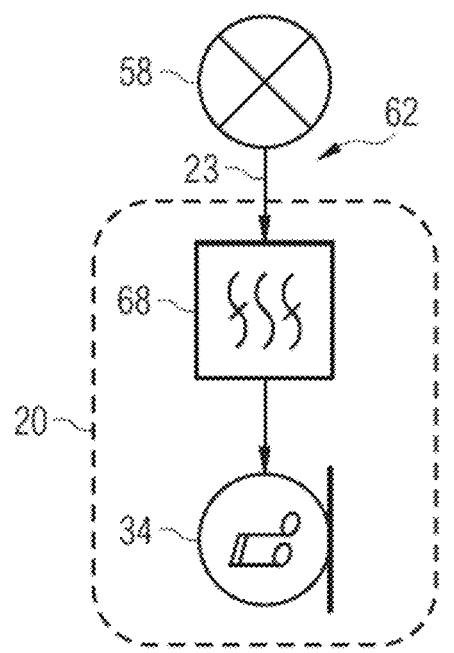
FIG. 7 shows a schematic equivalent circuit diagram for the fluid sensor from FIG. 6 in accordance with one exemplary embodiment.

FIG. 7 shows a schematic evaluation circuit diagram for the fluid sensor 60. The emitter 58 is configured to emit the thermal radiation 23. The filling 68, i.e. the fluid or the vacuum, can act as a filter for the radiation 23 or 23', which can influence the excitation of the membrane 16 or the microphone.

The exemplary embodiments described herein describe a reference chamber which is evacuated during production, that is to say that as far as possible all fluid is removed from it. The housing or the reference chamber is filled with a defined reference fluid or a reference gas, which can be a pure gas or a mixture of two or more gases, in order to amplify thermal effects or transient effects, for example. As soon as the reference chamber has been closed and tests by the manufacturer have been concluded, one requirement or one desire in respect of the reference chamber is that the reference concentration of the fluid in the chamber remains unchanged over the lifetime. The exemplary embodiments make it possible to carry out an autocalibration in accordance with the current fluid properties. The membrane or the microphone can be controlled (biased), for instance using an ASIC, wherein the ASIC has a carefully set operating point below the pull-in/snap-in voltage. During the autocalibration described, the ASIC can increase its voltage, such that the latter rises above the pull-in voltage and triggers the effect that the membrane strikes the backplate electrode. By reducing the voltage below the release voltage, the mechanical contact is released and the membrane returns to its rest position. During mechanical striking and in particular during release, the membrane exhibits its mechanical resonance, which can be strongly coupled to its fluid-dynamic environment. Since the mechanical-fluidic interaction is damped by the reference gas, for example, the mechanical response of the membrane depends on the gas properties such as density, mass, viscosity and thermal transience. In contrast thereto, in the case of a reference chamber under vacuum, air can introduce the damping properties. If it is ascertained that the pull-in/release (release voltage) do not correspond to the manufacturer's calibration data while the sensor is filled with the reference gas, the assumption can be made that the reference chamber is untight or that means that there is no longer any reference gas at all arranged therein. In the case of small deviations or losses, it is possible for the present values to be stored anew as calibration or calibration values in order once again to provide a reliable measurement. In this case, this can be referred to as a recalibration or autocalibration of the sensor.

An autocalibration of this type will now be explained with reference to FIGS. 8a to 8f. In this case, FIGS. 8a, 8c and 8e show different successive states of an untight reference chamber 20', which is filled with the fluid 68 in the state in accordance with FIG. 8a, the concentration of which fluid is reduced in FIG. 8c. That is to say that the fluid 68' is arranged, which is reduced further in FIG. 8e, such that the fluid 68" is arranged. A decrease in the filling concentration can also be interpreted as a reduction of the number of fluid molecules 69 of the fluid 68, 68' and 68", respectively, that is to say that the atmospheric property in some examples relates to a number of fluid molecules in the housing.

By way of example, a signal level 72 originally obtained on the basis of the thermal radiation 23' can be reduced by the increasingly reduced amount 68' and 68", respectively, of fluid, such that a signal level 72' is reduced relative to the signal level 72 and a signal level 72" is reduced relative to the signal level 72'. A direction of the shift can indicate from what reference fluid to what (penetrating) external fluid the sensor drift moves. If the resonant frequency shifts downward to low frequencies, the reference fluid would be lighter than the ambient fluid, for example the case for vacuum. If the resonant frequency thus shifts upward to higher frequencies, the reference fluid would be heavier than the ambient fluid, for example in the case of a filling of the reference volume with $CO_2$ and an ambient fluid of air. By way of example, the decreasing filling of the fluid 68 has the effect that a decreasing excitation is obtained in the reference chamber 20'. FIGS. 8b, 8d and 8f show, analogously to FIGS. 3b and 3d, exemplary FFT illustrations assigned to FIGS. 8a, 8c and 8e, respectively. In the fault-free factory state in accordance with FIG. 8a, the signal 66 can have a resonant frequency $f_1$, for example. The decreasing concentration of the fluid 68' in accordance with FIG. 8c can lead to a frequency shift 74a of the resonant frequency from the frequency $f_1$ to the frequency $f_2$, which for example can be lower than the frequency $f_1$. If the frequency shift 74a exceeds a tolerance range, for instance 20%, 10% or 5% or an absolute value of 1000 Hz, 100 Hz, 50 Hz or 10 Hz relative to the frequency $f_1$, then the fluid sensor can be configured to carry out an autocalibration, that is to say to store the present state as new reference state and to store for example the frequency $f_2$ as new reference frequency.

FIG. 8f shows a corresponding FFT diagram which is assigned to FIG. 8e and in which a frequency shift 74b toward the frequency $f_3$ has taken place, which can be linked at least partly through the further decreasing degree of filling of the fluid 68" and the signal level 72" associated therewith. That is to say, for example, that the signal level 72, 72' and/or 72" can have an identical voltage level but different properties, for instance frequencies.

The evaluation device and/or the computing device can be configured to monitor the frequency shift 74a and/or 74b or a change in other monitored parameters in order firstly to ascertain a slow drift and also to indicate an imminent failure of the fluid sensor and/or of the reference chamber for example upon a specific threshold value being exceeded. In this regard, by way of example, the frequency shift 74a can be interpreted as tolerable drift and/or as a request for replacement or maintenance, while the drift 74b can be interpreted as directly imminent failure that for example requests a user to shut down the corresponding apparatus and/or to bring it to a safe state.

Although the frequency shifts 74a and 74b have been described such that a reduction in the frequency takes place, alternatively an increase in the frequency can also take place, for instance if ambient air or at least a gas having a higher density penetrates into an evacuated space of the reference chamber 20'.

Figure 9:
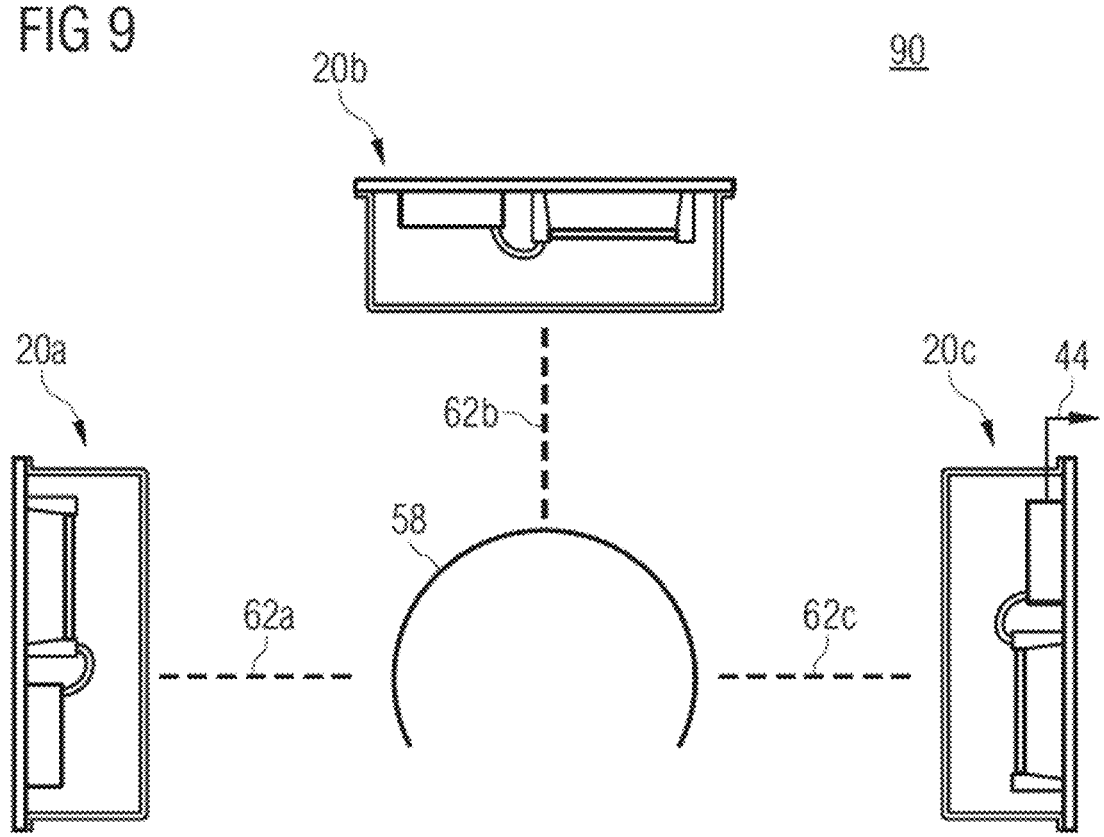
FIG. 9 shows a schematic block diagram of a fluid sensor in accordance with one exemplary embodiment, which has a plurality of reference chambers.

FIG. 9 shows a schematic block diagram of a fluid sensor 90 in accordance with one exemplary embodiment, which has a plurality of reference chambers 20a, 20b and 20c. Although the fluid sensor 90 is described such that it has three reference chambers 20a, 20b and 20c, it can have a different number of reference chambers, for instance at least one, at least two, at least three, at least five or more, for instance ten. Although the fluid sensor 90 is illustrated such that it has identically constructed reference chambers 20, alternatively or additionally at least one of the reference chambers can be formed differently therefrom, for instance by arranging the reference chamber 10 and/or 50. At least one of the reference chambers 20a to 20c can be configured to output the signal 44 such that the fault state of the fluid sensor 90 is indicated.

An absorption path 62a to 62c is assigned to each of the reference chambers 20a to 20c. This makes it possible to carry out a plurality of measurements in parallel in each of the absorption paths 62a to 62c or with each of the reference chambers 20a to 20c.

By way of example, at least two of the reference chambers 20a to 20c in a desired state and functional operating state can have an identical atmospheric property in the housing, that is to say that the filling or non-filling in the respective housing can be identical. The reference chambers 20a to 20c can have a common evaluation device, a common control device and/or a common computing device. Alternatively or additionally, the control devices, the evaluation devices and/or the computing devices can be connected to one another and/or be controlled and/or evaluated by a superordinate unit. The evaluation device/computing device can be configured to compare the movement characteristic of the two identically formed reference chambers with one another. A deviation between the two movement characteristics, particularly if an identical gas or fluid is arranged in the absorption paths, can indicate a malfunction. This can be taken into account for example in such a way that the measurement result is classified as potentially defective. If a third reference chamber is used, for example, then by comparing the three measurement results it is possible to determine which of the three reference chambers is defective, for instance if two reference chambers still yield an identical result and the third measurement chamber deviates therefrom.

The evaluation device can be configured to output a signal indicating a fault state of the fluid sensor, for instance if the measurement results deviate from one another. This can be designed such that the signal is only output if the deviation lies outside a tolerance range of, for example, ±5%, ±10% or ±20%.

Figure 10:
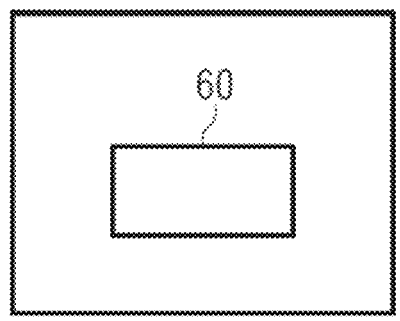
FIG. 10 shows a schematic block diagram of an apparatus in accordance with one exemplary embodiment, which comprises the fluid sensor from FIG. 6.

FIG. 10 shows a schematic block diagram of an apparatus 100 comprising the fluid sensor 60. Alternatively or additionally, the apparatus 100 can comprise the fluid sensor 90. The exemplary embodiment makes it possible to detect and/or to determine or to monitor fluids which are arranged around the apparatus 100 or in the apparatus 100. The apparatus can be for example an automobile, a mobile apparatus such as, for instance, a tablet, a cellular phone or the like. Alternatively or additionally, the apparatus 100 can be a building.

FIG. 11 shows a schematic flow diagram of a method 1100 for providing a reference chamber, for instance the reference chamber 10, 20 or 50. A step 1110 comprises providing a housing. A step 1120 comprises arranging a membrane, such that the membrane is arranged movably within the housing. A step 1130 comprises arranging a control device, such that the latter is configured to drive the membrane at a first point in time such that the membrane assumes a defined position, and to drive the membrane at a second point in time such that the membrane is moved out of the defined position and a movement of the membrane in the housing is thus obtained. The movement can be an oscillation. A step 1140 comprises arranging an evaluation device, such that the latter is configured to determine a movement characteristic of the movement of the membrane on the basis of the moving into the defined position or on the basis of the moving out of the defined position and to determine an atmospheric property in the housing on the basis of the movement characteristic.

FIG. 12 shows a schematic flow diagram of a method 1200 in accordance with one exemplary embodiment, which can be employed to determine an atmospheric property in a reference chamber, for instance the reference chamber 10, 20 or 50. A step 1210 comprises deflecting the membrane in the reference chamber at a first point in time, such that the membrane assumes a defined position and such that the membrane is moved out of the defined position at a second point in time and a movement of the membrane in the housing is obtained. In this case, by way of example, driving of an actuator and/or of a voltage source can be carried out, which can also be carried out using a computer or some other controllable controller. A step 1220 comprises determining a movement characteristic of the movement of the membrane on the basis of the moving into the defined position or on the basis of the moving out of the defined position. A step 1230 comprises determining an atmospheric property in the housing on the basis of the movement characteristic. This step, too, can be implemented using software.

Exemplary embodiments enable an in situ acoustic calibration for acoustic stimuli. Acoustic stimuli can be generated internally by the use of a heat source, the emitter and a thermoacoustic coupling in the fluid sensor. The thermal source can couple into the reference chamber gas, which can lead to a pressure rise (heating) or pressure drop (cooling).

A transient behavior can represent microphone characteristics such as, for instance, amplitude and/or cut-off frequency. The lower cut-off frequency, for instance in the case of a ventilation concept, can likewise be used to differentiate between a tight and an untight housing.

The movement of the membrane can be detected electrically and/or optically, for instance in order to detect a snap-in or a pull-in. The ASIC can output an electrical feedback which has a high frequency in the non-audible range with respect to the resonant frequency.

The exemplary embodiments make it possible to measure the concentration of the reference gas without additional devices or hardware being required for this purpose. The exemplary embodiments make it possible to refine the measurements by means of a precalibration of the reference gas properties, for instance in order to avoid or reduce long-term diffusion effects or long-term drift effects. The exemplary embodiments enable both an autocalibration and the notification that a sensor failure is imminent.

The exemplary embodiments relate to health effects as a result of contamination, since increasingly there are growing misgivings vis-à-vis health owing to air contamination. There is a high and growing demand for convenience and well-being. The exemplary embodiments can in particular also be used in energy-efficient buildings, for instance heated, ventilated and air-conditioned buildings (heating, ventilation and air conditioning—HVAC) or systems. The exemplary embodiments enable a reliable concept for ascertaining the air quality and the change therein in real time.

Some exemplary embodiments can use a second reference chamber and enable a comparison of the results thereof with one another, wherein preferably at least one reference chamber has no drift or has no untightness. Some exemplary embodiments can have an additional resonator, that is to say an actuator, which is arranged in the reference chamber in order to set the membrane in motion, and in order thus to determine the gas properties in the reference chamber. It is possible, for the calibration, also to introduce a predetermined fluid or gas into the absorption path, such that the absorption of the thermal radiation is likewise regarded as known and the property in the reference chamber can thus be determined with high quality. Exemplary embodiments comprise measuring a transient recovery time owing to the mechanical contact and/or owing to the release, which can be understood in each case as rectangular excitation or as pull-in excitation, which enable a broadband mechanical excitation. The higher the damping, the longer the decay time as a result of the internal coupled forces. This can involve an effect having a duration of a few µs to ms.

The exemplary embodiments described herein can also be described such that before a measurement or after a measurement and possibly during operation of the sensor, an excitation of the membrane is carried out, the movement characteristic and/or oscillation behavior of which is measured and is compared with a reference value. The comparison with the reference value allows a conclusion to be drawn about a change in the filling in the volume.

Although exemplary embodiments described herein have been described in connection with gases as fluid, these embodiments can readily be related to liquids, such that the fluids can be both gases and liquids. Fluid sensors described herein can thus be configured to measure a gas and/or a liquid.

Additional exemplary embodiments and aspects of the invention are described which can be used individually or in combination with the features and functionalities described herein.

In accordance with a first aspect, a reference chamber 10; 20; 50 for a fluid sensor can comprise the following features: a housing 12, 12'; a deflectable structure 16, which is arranged movably within the housing 12, 12'; a control device 24; 38 configured to drive the deflectable structure 16 at a first point in time $t_2$ such that the deflectable structure 16 assumes a defined position $x_2$, and to drive the deflectable structure 16 at a second point in time $t_4$ such that the deflectable structure 16 moves out of the defined position $x_2$ and a movement of the deflectable structure 16 in the housing 12, 12' is obtained; and an evaluation device 26; 38 configured to determine a movement characteristic of the movement of the deflectable structure 16 on the basis of the moving into the defined position $x_2$ or on the basis of the moving out of the defined position $x_2$ and to determine an atmospheric property in the housing 12, 12' on the basis of the movement characteristic.

In accordance with a second aspect referring to the first aspect, the reference chamber can have an electrode pair, wherein the deflectable structure 16 has a first electrode of the electrode pair, and wherein a second electrode 36 of the electrode pair is arranged adjacent to the first electrode; wherein the control device 24; 38 is configured to drive the deflectable structure 16 by applying a voltage difference to the electrode pair.

In accordance with a third aspect referring to the second aspect, at least one electrode 16; 36 of the electrode pair can comprise an insulation structure 48 configured to prevent an electrical short circuit between the first 16 and second 36 electrode during a mechanical contact between the first 16 and second 36 electrode.

In accordance with a fourth aspect referring to the first aspect, the deflectable structure 16 in the defined position $x_2$ can carry out a mechanical contact with a supporting structure 56 or an electrode 36.

In accordance with a fifth aspect referring to the fourth aspect, the control device 24; 38 can be configured to drive the deflectable structure 16 such that the mechanical contact is carried out while a bounce movement is carried out.

In accordance with a sixth aspect referring to the first aspect, the movement can comprise an oscillation of the deflectable structure 16 into the defined position $x_2$ or an oscillation of the deflectable structure out of the defined position $x_2$ into a rest position $x_1$.

In accordance with a seventh aspect referring to the first aspect, the deflectable structure 16 can comprise an electrode that is part of an electrode pair, and wherein the control device 24; 38 is configured to apply to the electrode pair at the first point in time $t_2$ a voltage that is greater than a snap-in voltage of the electrode pair, and to apply to the electrode pair at the second point in time $t_4$ a voltage that is less than or equal to a release voltage that leads to a release of the first electrode 16 from the second electrode 36.

In accordance with an eighth aspect referring to the first aspect, the reference chamber can furthermore comprise an actuator 52 coupled to the deflectable structure 16, wherein the control device 24; 38 is configured to control the actuator 52 in order to move the deflectable structure 16 into the defined position $x_2$ or out of the defined position $x_2$.

In accordance with a ninth aspect referring to the first aspect, the movement characteristic can provide information regarding a change in a movement resistance of a filling medium 68 in the housing 12, 12', said movement resistance acting on the deflectable structure 16.

In accordance with a tenth aspect referring to the first aspect, the movement characteristic can comprise at least one from a dead time $t_{dead}$ until the deflectable structure 16 moves out of the defined position $x_2$, an oscillation frequency f of the deflectable structure 16, an oscillation amplitude x of the deflectable structure 16, an oscillation damping 42 of the oscillation of the deflectable structure 16, a slope dx/dt of the movement of the deflectable structure 16, a limiting frequency of the deflectable structure 16 and a resonant frequency of the oscillation of the deflectable structure.

In accordance with an eleventh aspect referring to the first aspect, the atmospheric property can relate to at least one from a pressure within the housing 12, 12', a composition of a fluid 68 in the housing 12, 12' and a number of fluid molecules 69 in the housing.

In accordance with a twelfth aspect referring to the first aspect, the evaluation device 26; 38 can be configured to detect the movement characteristic during a calibration interval, to store information based on the movement characteristic in a memory as reference value and once again to detect the movement characteristic during a checking interval, to compare it with the stored information in order to obtain a comparison result, and to determine the atmospheric property on the basis of the comparison result.

In accordance with a thirteenth aspect referring to the twelfth aspect, the calibration interval can be a first calibration interval and the evaluation device 26; 38 can be configured to detect the movement characteristic during a second calibration interval and to store information based on the movement characteristic of the second calibration interval in the memory as new reference value.

In accordance with a fourteenth aspect referring to the first aspect, the evaluation device can be configured to output a signal 44 indicating a deviation of the atmospheric property from a reference state taking account of a tolerance range.

In accordance with a fifteenth aspect referring to the first aspect, the evaluation device can be configured to indicate a leak in the housing 12, 12' or an imminent failure of the reference chamber on the basis of the atmospheric property.

In accordance with a sixteenth aspect referring to the first aspect, the control device 24; 38 can be configured to wait between the first point in time $t_2$ and the second point in time $t_4$ for a time interval to elapse which enables a rest state $x_1$ of the deflectable structure 16 to be obtained.

In accordance with a seventeenth aspect referring to the first aspect, the housing can be formed in a hermetically sealed fashion in a functional operating state, wherein the evaluation device 26; 38 can be configured to ascertain an untightness of the housing 12, 12' on the basis of an atmospheric property that is variable over time.

In accordance with an eighteenth aspect referring to the first aspect, the housing 12, 12' in a functional operating state can be filled with a reference gas 68; 68', 68" or a low pressure.

In accordance with a nineteenth aspect referring to the first aspect, the deflectable structure can be part of a pressure transducer 34.

In accordance with a twentieth aspect referring to the nineteenth aspect, the pressure transducer 34 can be a microphone.

In accordance with a twenty-first aspect referring to the first aspect, the evaluation device 26; 38 can be configured to determine the movement characteristic optically or electrically.

In accordance with a twenty-second aspect referring to the first aspect, the deflectable structure 16 can comprise a first electrode of an electrode pair and the first electrode and a second electrode 36 of the electrode pair can be closed, and a closed volume can be present between the first 10 and second 36 electrode of the electrode pair.

In accordance with a twenty-third aspect referring to the first aspect, the deflectable structure 16 can be a membrane.

In accordance with a twenty-fourth aspect, a fluid sensor 60; 90 can comprise the following features: an emitter 58 configured to emit a thermal radiation 23'; a reference chamber 10; 20; 50 in accordance with the first aspect, which is configured to receive at least one portion 23 of the thermal radiation 23'; an absorption path 62; 62a-c arranged between the emitter 58 and the reference chamber 10; 20; 50; wherein the fluid sensor can be configured to perform a photoacoustic evaluation of a fluid 64 arranged in the absorption path 62; 62a-c on the basis of an evaluation of a movement of the deflectable structure 16 that is generated by the thermal radiation 23'.

In accordance with a twenty-fifth aspect referring to the twenty-fourth aspect, the evaluation device 26; 38 can be configured to carry out the evaluation of the movement of the deflectable structure 16 that is generated by the thermal radiation 23' in the reference chamber 10; 20; 50 for the one photoacoustic evaluation during a measurement interval, and to determine a fluid property of the fluid 64 arranged in the absorption path 62; 62a-c on the basis of the evaluation.

In accordance with a twenty-sixth aspect referring to the twenty-fourth aspect, the fluid sensor can be configured to drive the emitter 58 with a rectangular signal.

In accordance with a twenty-seventh aspect referring to the twenty-fourth aspect, the deflectable structure 16 can comprise a first electrode of an electrode pair, wherein the fluid sensor can be configured to apply to the electrode pair a voltage that is less than a snap-in voltage for the evaluation of the movement of the deflectable structure 16 that is generated by the thermal radiation 23'.

In accordance with a twenty-eighth aspect referring to the twenty-fourth aspect, the fluid sensor can be formed as a gas sensor.

In accordance with a twenty-ninth aspect referring to the twenty-fourth aspect, the fluid sensor can comprise a plurality of reference chambers 20a-c, wherein an absorption path 62a-c is assigned to each reference chamber 20a-c.

In accordance with a thirtieth aspect referring to the twenty-ninth aspect, a first reference chamber 20a-c and a second reference chamber 20a-c of the plurality of reference chambers in a functional operating state can have an identical atmospheric property in the housing 12, wherein the evaluation device 26; 38 can be configured to compare the movement characteristic of the first 20a and second 20b reference chamber with one another and, in the case of a deviation outside a tolerance range, to output a signal 44 indicating a fault state of the fluid sensor.

In accordance with a thirty-first aspect, an apparatus 100 can comprise a fluid sensor 60; 90 in accordance with the twenty-third aspect.

In accordance with a thirty-second aspect referring to the thirty-first aspect, the apparatus can be formed as an automobile, a cellular phone or a building.

In accordance with a thirty-third aspect, a method 1100 for providing a reference chamber can comprise the following steps: providing 1110 a housing; arranging 1120 a deflectable structure, such that the deflectable structure is arranged movably within the housing; arranging 1130 a control device, such that the latter is configured to drive the deflectable structure at a first point in time such that the deflectable structure assumes a defined position, and to drive the deflectable structure at a second point in time such that the deflectable structure moves out of the defined position and a movement of the deflectable structure in the housing is obtained; arranging 1140 an evaluation device, such that the latter is configured to determine a movement characteristic of the movement of the deflectable structure on the basis of the moving into the defined position or on the basis of the moving out of the defined position and to determine an atmospheric property in the housing on the basis of the movement characteristic.

In accordance with a thirty-fourth aspect, a method 1200 for determining an atmospheric property in a reference chamber having a deflectable structure arranged movably within a housing, can comprise the following steps: deflecting 1210 the deflectable structure at a first point in time, such that the deflectable structure assumes a defined position and such that the deflectable structure at a second point in time moves out of the defined position and a movement of the deflectable structure in the housing is obtained; determining 1220 a movement characteristic of the movement of the deflectable structure on the basis of the moving into the defined position or on the basis of the moving out of the defined position; and determining 1230 an atmospheric property in the housing on the basis of the movement characteristic.

In accordance with a thirty-fifth aspect, a computer program can comprise a program code for carrying out the method according to the thirty-fourth aspect when the program runs on a computer.

Although some aspects have been described in association with an apparatus, it goes without saying that these aspects also constitute a description of the corresponding method, such that a block or a component of an apparatus should also be understood as a corresponding method step or as a feature of a method step. Analogously thereto, aspects that have been described in association with or as a method step also constitute a description of a corresponding block or detail or feature of a corresponding device.

Depending on specific implementation requirements, exemplary embodiments of the invention can be implemented in hardware or in software. The implementation can be effected using a digital storage medium, for example a floppy disk, a DVD, a Blu-ray disk, a CD, a ROM, a PROM, an EPROM, an EEPROM, or a FLASH memory, a hard disk or some other magnetic or optical storage unit on which are stored electronically readable control signals which can interact or interact with a programmable computer system in such a way that the respective method is carried out. Therefore, the digital storage medium can be computer-readable. Some exemplary embodiments according to the invention thus comprise a data carrier having electronically readable control signals which are able to interact with a programmable computer system in such a way that one of the methods described herein is carried out.

Generally, exemplary embodiments of the present invention can be implemented as a computer program product comprising a program code, wherein the program code is effective for carrying out one of the methods when the computer program product runs on a computer. The program code can for example also be stored on a machine-readable carrier.

Other exemplary embodiments comprise the computer program for carrying out one of the methods described herein, wherein the computer program is stored on a machine-readable carrier.

In other words, one exemplary embodiment of the method according to the invention is thus a computer program comprising a program code for carrying out one of the methods described herein when the computer program runs on a computer. A further exemplary embodiment of the methods according to the invention is thus a data carrier (or a digital storage medium or a computer-readable medium) on which the computer program for carrying out one of the methods described herein is recorded.

A further exemplary embodiment of the method according to the invention is thus a data stream or a sequence of signals which constitute(s) the computer program for carrying out one of the methods described herein. The data stream or the sequence of signals can be configured for example to the effect of being transferred via a data communication connection, for example via the Internet.

A further exemplary embodiment comprises a processing device, for example a computer or a programmable logic component, which is configured or adapted to the effect of carrying out one of the methods described herein.

A further exemplary embodiment comprises a computer on which the computer program for carrying out one of the methods described herein is installed.

In some exemplary embodiments, a programmable logic component (for example a field programmable gate array, an FPGA) can be used to carry out some or all functionalities of the methods described herein. In some exemplary embodiments, a field programmable gate array can cooperate with a microprocessor in order to carry out one of the methods described herein. Generally, the methods in some exemplary embodiments are carried out on the part of an arbitrary hardware apparatus. The latter can be universally usable hardware such as a computer processor (CPU) or hardware specific to the method, such as an ASIC, for example.

The exemplary embodiments described above merely represent an illustration of the principles of the present invention. It goes without saying that modifications and variations of the arrangements and details described herein will be apparent to others skilled in the art. Therefore, the intention is for the invention to be restricted only by the scope of protection of the following patent claims and not by the specific details that have been presented herein on the basis of the description and the explanation of the exemplary embodiments.

What is claimed is:

1. A reference chamber for a fluid sensor, comprising:
   a hermetically sealed housing, wherein the housing is filled with a reference gas or low pressure when the housing is in a functional state;
   a deflectable structure, which is arranged movably within the housing;
   a control device configured to perform a plurality of driving sequences, wherein each driving sequence of the plurality of driving sequences is performed by driving the deflectable structure at a first point in time to cause the deflectable structure to move into a defined position in which the deflectable structure mechanically contacts a supporting structure or electrode, and driving the deflectable structure at a second point in time to cause the deflectable structure to move out of the defined position, wherein movement of the deflectable structure in the housing is obtained; and
   an evaluation device configured:
      in response to the control device performing the driving sequence, to determine a movement characteristic of the movement of the deflectable structure as the deflectable structure mechanically contacts the supporting structure or the electrode when moving into the defined position or as the deflectable structure stops contacting the supporting structure or the electrode when moving out of the defined position, to store a plurality of the determined movement characteristics corresponding to the plurality of driving sequences, wherein each of the determined movement characteristics represents a frequency of an entire corresponding underdamped response of the deflectable structure, wherein the underdamped response begins a time that the deflectable structure leaves the defined position to a time when the deflectable structure reaches a rest state, or the underdamped response begins from a time that the deflectable structure leaves the rest state to a time when the deflectable structure reaches the defined position, to compare a first determined movement characteristic of the plurality of the determined movement characteristics with a second determined movement characteristic of the plurality of the determined movement characteristics, and to determine an atmospheric property in the housing based on the comparing.

2. The reference chamber as claimed in claim 1, further comprising an electrode pair, wherein the deflectable structure has a first electrode of the electrode pair, and wherein a second electrode of the electrode pair is arranged adjacent to the first electrode; and wherein the control device is configured to drive the deflectable structure by applying a voltage difference to the electrode pair.

3. The reference chamber as claimed in claim 2, wherein at least one electrode of the electrode pair comprises an insulation structure configured to prevent an electrical short circuit between the first electrode and the second electrode during a mechanical contact between the first electrode and the second electrode.

4. The reference chamber as claimed in claim 1, wherein the control device is further configured to drive the deflectable structure, to cause mechanical contact during a bounce movement.

5. The reference chamber as claimed in claim 1, wherein the movement comprises an oscillation of the deflectable structure into the defined position or an oscillation of the deflectable structure out of the defined position into a rest position.

6. The reference chamber as claimed in claim 1, wherein the deflectable structure comprises an electrode that is part of an electrode pair, and wherein the control device is configured to apply to the electrode pair at the first point in time a voltage that is greater than a snap-in voltage of the electrode pair, and to apply to the electrode pair at the second point in time a voltage that is less than or equal to a release voltage that leads to a release of a first electrode of the electrode pair from a second electrode of the electrode pair.

7. The reference chamber as claimed in claim 1, further comprising an actuator coupled to the deflectable structure, wherein the control device is configured to control the actuator to cause the deflectable structure to move into the defined position or out of the defined position.

8. The reference chamber as claimed in claim 1, wherein the movement characteristic provides information regarding a change in a movement resistance of a filling medium in the housing, said movement resistance acting on the deflectable structure.

9. The reference chamber as claimed in claim 1, wherein the movement characteristic further comprises at least one of a dead time until the deflectable structure moves out of the defined position, an oscillation frequency of the deflectable structure, an oscillation amplitude of the deflectable structure, an oscillation damping of the oscillation of the deflectable structure, a slope of the movement of the deflectable structure, a limiting frequency of the deflectable structure or a resonant frequency of the oscillation of the deflectable structure.

10. The reference chamber as claimed in claim 1, wherein the atmospheric property relates to at least one from a pressure within the housing, a composition of a fluid in the housing or a number of fluid molecules in the housing.

11. The reference chamber as claimed in claim 1, wherein the evaluation device is configured to output a signal indicating a deviation of the atmospheric property from a reference state taking account of a tolerance range.

12. The reference chamber as claimed in claim 1, wherein the evaluation device is configured to indicate a leak in the housing or an imminent failure of the reference chamber based on the atmospheric property.

13. The reference chamber as claimed in claim 1, wherein the control device is configured to wait between the first point in time and the second point in time for a time interval to elapse to enable a rest state of the deflectable structure.

14. The reference chamber as claimed in claim 1, wherein the evaluation device is configured to ascertain an untightness of the housing based on the atmospheric property varying over time.

15. The reference chamber as claimed in claim 1, wherein the deflectable structure is part of a pressure transducer.

16. The reference chamber as claimed in claim 15, wherein the pressure transducer is a microphone.

17. The reference chamber as claimed in claim 1, wherein the evaluation device is configured to determine the movement characteristic optically or electrically.

18. The reference chamber as claimed in claim 1, wherein the deflectable structure comprises a first electrode of an electrode pair, the first electrode and a second electrode of the electrode pair are closed, and a closed volume is present between the first and second electrode of the electrode pair.

19. The reference chamber as claimed in claim 1, wherein the deflectable structure is a membrane.

20. A fluid sensor comprising:
an emitter configured to emit a thermal radiation;
a reference chamber configured to receive at least one portion of the thermal radiation, the reference chamber comprising:
a hermetically sealed housing, wherein the housing is filled with a reference gas or low pressure when the housing is in a functional state,
a deflectable structure, which is arranged movably within the housing,
a control device configured to perform a driving sequence a plurality of times, the driving sequence comprising driving the deflectable structure at a first point in time to cause the deflectable structure to move into a defined position in which the deflectable structure mechanically contacts a supporting structure or electrode, and driving the deflectable structure at a second point in time to cause the deflectable structure to move out of the defined position, wherein movement of the deflectable structure in the housing is obtained,
an evaluation device configured to:
in response to the control device performing the driving sequence, determine a movement characteristic of the movement of the deflectable structure as the deflectable structure mechanically contacts the supporting structure or the electrode when the moving into the defined position or as the deflectable structure stops contacting the supporting structure or the electrode when moving out of the defined position, store a plurality of the determined movement characteristics corresponding to the plurality of driving sequences, wherein each of the determined movement characteristics represents a frequency of an entire corresponding underdamped response of the deflectable structure, wherein the underdamped response begins a time that the deflectable structure leaves the defined position to a time when the deflectable structure reaches a rest state, or the underdamped response begins from a time that the deflectable structure leaves the rest state to a time when the deflectable structure reaches the defined position, compare a first determined movement characteristic of the plurality of the determined movement characteristics with a second determined movement characteristic of the plurality of the determined movement characteristics, and determine an atmospheric property in the housing based on the comparing; and an absorption path arranged between the emitter and the reference chamber, wherein the fluid sensor is configured to perform a photoacoustic evaluation of a fluid arranged in the absorption path, the photoacoustic evaluation comprising evaluating the movement of the deflectable structure caused by the thermal radiation.

21. The fluid sensor as claimed in claim 20, wherein the evaluation device is configured to evaluate the movement of the deflectable structure that is caused by the thermal radiation in the reference chamber for the photoacoustic evaluation during a measurement interval, and to determine a fluid property of the fluid arranged in the absorption path based the evaluation.

22. The fluid sensor as claimed in claim 20, wherein the fluid sensor is configured to drive the emitter with a rectangular signal.

23. The fluid sensor as claimed in claim 20, wherein the deflectable structure comprises a first electrode of an electrode pair, wherein the fluid sensor is configured to apply to the electrode pair a voltage that is less than a snap-in voltage for the evaluation of the movement of the deflectable structure that is generated by the thermal radiation.

24. The fluid sensor as claimed in claim 20, wherein the fluid sensor comprises a gas sensor.

25. The fluid sensor as claimed in claim 20, wherein the reference chamber comprises a plurality of reference chambers, the absorption path comprises a plurality of absorption paths, and a corresponding absorption path of the plurality of absorption paths is assigned to each reference chamber.

26. The fluid sensor as claimed in claim 25, wherein a first reference chamber and a second reference chamber of the plurality of reference chambers in a functional operating state have an identical atmospheric property in the housing, wherein the evaluation device is configured to compare the movement characteristic of the first and second reference chamber with one another and, in the case of a deviation outside a tolerance range, to output a signal indicating a fault state of the fluid sensor.

27. An apparatus comprising the fluid sensor as claimed in claim 20.

28. The apparatus as claimed in claim 27, wherein the apparatus comprises an automobile, a cellular phone or a building.

29. A method for providing a reference chamber comprising the following steps:

providing a hermetically sealed housing;

filling the housing with a reference gas or a low pressure, wherein the housing is filled with the reference gas or the low pressure when the housing is in a functional state;

arranging a deflectable structure movably within the housing;

arranging a control device configured to perform a driving sequence a plurality of times, the driving sequence comprising driving the deflectable structure at a first point in time to cause the deflectable structure to move into a defined position in which the deflectable structure mechanically contacts a supporting structure or electrode, and driving to drive the deflectable structure at a second point in time to cause the deflectable structure to move out of the defined position, wherein a movement of the deflectable structure in the housing is obtained; and arranging an evaluation device configured to:

in response to the control device performing the driving sequence, determine a movement characteristic of the movement of the deflectable structure as the deflectable structure mechanically contacts the supporting structure or the electrode when moving into the defined position or as the deflectable structure stops contacting the supporting structure or the electrode when moving out of the defined position, store a plurality of the determined movement characteristics corresponding to the plurality of driving sequences, wherein each of the determined movement characteristics represents a frequency of an entire corresponding underdamped response of the deflectable structure, wherein the underdamped response begins a time that the deflectable structure leaves the defined position to a time when the deflectable structure reaches a rest state, or the underdamped response begins from a time that the deflectable structure leaves the rest state to a time when the deflectable structure reaches the defined position, compare a first determined movement characteristic of the plurality of the determined movement characteristics with a second determined movement characteristic of the plurality of the determined movement characteristics, and determine an atmospheric property in the housing based on the comparing.

30. A method for determining an atmospheric property in a reference chamber having a deflectable structure arranged movably within a hermetically sealed housing, wherein the housing is filled with a reference gas or low pressure when the housing is in a functional state, the method comprising:

performing a plurality of driving sequences, wherein each driving sequence of the plurality of driving sequences is performed by moving the deflectable structure at a first point in time into a defined position in which the deflectable structure mechanically contacts a supporting structure or electrode, and moving the deflectable structure at a second point in time out of the defined position, wherein a movement of the deflectable structure in the housing is obtained;

determining a movement characteristic of the movement of the deflectable structure as the deflectable structure mechanically contacts the supporting structure or the electrode when moving into the defined position or as the deflectable structure stops contacting the supporting structure or the electrode when moving out of the defined position;

storing a plurality of the determined movement characteristics corresponding to the plurality of driving sequences, wherein each of the determined movement characteristics represents a frequency of an entire corresponding underdamped response of the deflectable structure, wherein the underdamped response begins a time that the deflectable structure leaves the defined position to a time when the deflectable structure reaches a rest state, or the underdamped response begins from a time that the deflectable structure leaves the rest state to a time when the deflectable structure reaches the defined position;

comparing a first determined movement characteristic of the plurality of the determined movement characteristics with a second determined movement characteristic of the plurality of the determined movement characteristics; and determining an atmospheric property in the housing based on the comparing.

31. A non-transitory computer readable medium with an executable program stored thereon, wherein the program instructs a processor to perform the method as claimed in claim 30.

* * * * *

UNITED STATES PATENT AND TRADEMARK OFFICE
CERTIFICATE OF CORRECTION

| | |
|---|---|
| PATENT NO. | : 11,549,917 B2 |
| APPLICATION NO. | : 16/053177 |
| DATED | : January 10, 2023 |
| INVENTOR(S) | : David Tumpold et al. |

It is certified that error appears in the above-identified patent and that said Letters Patent is hereby corrected as shown below:

In the Claims

Claim 29, Column 26, Line 21; delete "to drive".

Signed and Sealed this
Fourteenth Day of February, 2023

Katherine Kelly Vidal
*Director of the United States Patent and Trademark Office*